United States Patent
Sugasaki et al.

(10) Patent No.: US 8,541,534 B2
(45) Date of Patent: *Sep. 24, 2013

(54) RESIN COMPOSITION FOR LASER ENGRAVING, RELIEF PRINTING PLATE PRECURSOR FOR LASER ENGRAVING, RELIEF PRINTING PLATE AND METHOD FOR PRODUCING RELIEF PRINTING PLATE

(75) Inventors: Atsushi Sugasaki, Shizuoka-ken (JP); Takashi Kawashima, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/147,368

(22) PCT Filed: Feb. 5, 2010

(86) PCT No.: PCT/JP2010/052112
§ 371 (c)(1),
(2), (4) Date: Aug. 2, 2011

(87) PCT Pub. No.: WO2010/090345
PCT Pub. Date: Aug. 12, 2010

(65) Prior Publication Data
US 2011/0311776 A1    Dec. 22, 2011

(30) Foreign Application Priority Data

Feb. 5, 2009  (JP) ................. 2009-024715
Aug. 14, 2009  (JP) ................. 2009-187937
Oct. 15, 2009  (JP) ................. 2009-238681

(51) Int. Cl.
*C08G 77/04*   (2006.01)
*B05D 3/06*   (2006.01)
*B29C 35/08*   (2006.01)

(52) U.S. Cl.
USPC ............... 528/33; 522/2; 264/400; 428/156; 427/554; 430/170

(58) Field of Classification Search
USPC ......... 428/156; 522/2; 264/400; 430/170.1, 430/281.1, 286.1, 170, 281, 286.11; 427/554; 528/33; 525/61, 329.7

See application file for complete search history.

(56) References Cited

U.S. PATENT DOCUMENTS

| | | | |
|---|---|---|---|
| 5,320,923 A * | 6/1994 | Nguyen | 430/78 |
| 5,798,202 A | 8/1998 | Cushner et al. | |
| 6,702,437 B2 * | 3/2004 | Fujimaki et al. | 347/101 |
| 7,901,863 B2 * | 3/2011 | Yamada et al. | 430/270.1 |
| 2002/0010271 A1 * | 1/2002 | Toui et al. | 525/100 |
| 2004/0157162 A1 | 8/2004 | Yokota et al. | |
| 2008/0038544 A1 * | 2/2008 | Kitaike et al. | 428/336 |
| 2009/0075199 A1 * | 3/2009 | Lungu | 430/281.1 |
| 2009/0246469 A1 * | 10/2009 | Kawashima et al. | 428/156 |
| 2011/0156317 A1 * | 6/2011 | Yoshida | 264/400 |
| 2011/0293897 A1 * | 12/2011 | Kawashima | 428/195.1 |
| 2011/0311776 A1 * | 12/2011 | Sugasaki et al. | 428/156 |
| 2011/0318537 A1 * | 12/2011 | Yoshida | 428/156 |
| 2011/0319563 A1 * | 12/2011 | Yamashita | 525/61 |

FOREIGN PATENT DOCUMENTS

| | | |
|---|---|---|
| JP | 10-278443 A | 10/1998 |
| JP | 2001-121833 A | 5/2001 |
| JP | 2001-219664 A | 8/2001 |
| JP | 2002-3665 A | 1/2002 |
| JP | 3438404 B2 | 8/2003 |
| JP | 2004-174758 A | 6/2004 |
| JP | 2004-262135 A | 9/2004 |
| JP | 2005-254696 A | 9/2005 |
| JP | 2006-2061 A | 1/2006 |
| WO | 03/022594 A1 | 3/2003 |

OTHER PUBLICATIONS

"Functional Group." [online] Retrieved online [Jan. 25, 2013] Retrieved from Internet: <URL:http://www.wikipedia.org/wiki/functional group>.*

* cited by examiner

*Primary Examiner* — Hannah Pak
(74) *Attorney, Agent, or Firm* — SOLARIS Intellectual Property Group, PLLC

(57) ABSTRACT

A resin composition for laser engraving, including: a compound (A) having at least one of a hydrolyzable silyl group or a silanol group; and a binder polymer (B) having a functional group capable of forming a crosslinked structure by reacting with at least one of a hydrolyzable silyl group or a silanol group.

30 Claims, No Drawings

RESIN COMPOSITION FOR LASER ENGRAVING, RELIEF PRINTING PLATE PRECURSOR FOR LASER ENGRAVING, RELIEF PRINTING PLATE AND METHOD FOR PRODUCING RELIEF PRINTING PLATE

TECHNICAL FIELD

The present invention relates to a resin composition for laser engraving, a relief printing plate precursor for laser engraving, a relief printing plate and a method for producing a relief printing plate.

BACKGROUND ART

As a method for making a printing plate by forming concavities and convexities on a photosensitive resin layer layered on a support surface, a method where a relief forming layer formed of a photosensitive composition is exposed to UV-rays through an original image film, an image portion is selectively cured, and an uncured portion is removed with a developer, so-called "analogue plate making", is well known.

A relief printing plate is an anastatic printing plate having a relief layer with concavities and convexities. The relief layer with concavities and convexities is obtained by patterning a relief forming layer containing a photosensitive composition containing, as a main component, an elastomer polymer such as a synthetic rubber, a resin such as a thermoplastic resin or a mixture of a resin and a plasticizer to form concavities and convexities. Among such relief printing plates, a relief printing plate having a soft relief layer is called a flexo printing plate in some cases.

When a relief printing plate is produced by analogue plate making, in general, an original image film formed with silver salt materials is necessary; accordingly, it takes a long time to produce an original image film, and the cost is high. Furthermore, a chemical process is necessary to develop an original image film, and disposal of a development waste liquid is also necessary. Accordingly, a method for more readily producing a printing plate such as a method that does not use an original image film or a method that does not require development is under study.

Recently, a method where plate making is performed by means of scanning exposure of a relief forming layer without using an original image film is under study.

For a method that does not require an original image film, a relief printing plate precursor where a laser-sensitive mask layer element capable of forming an image mask is disposed on a relief forming layer has been proposed (see, for example, U.S. Pat. No. 5,798,202 and Japanese Patent Application Laid-Open (JP-A) No. 2002-3665). According to these plate making methods, an image mask having the same function as that of an original image film is formed from the mask layer element by laser irradiation based on image data. Accordingly, the method is referred to as a "mask CTP method" and does not require an original image film. However, a subsequent plate making step is a step where UV-rays are irradiated through the image mask and an uncured portion is developed and removed. That is, there is still a room for improvement with respect to the point that a development process is necessary.

As a plate making method that does not require a development step, a so-called "direct engraving CTP method" where a relief forming layer is directly engraved with a laser to make a plate has been proposed many times. The direct engraving CTP method is literally a method of forming concavities and convexities, which will serve as a relief, by laser engraving. This method is advantageous in that the relief shape may be freely controlled, unlike the relief formation process using an original image film. For this reason, in the case of forming an image such as an outline character, the image region may be engraved deeper than other regions, and in the case of forming a microdot image, shouldered engraving in consideration of resistance to printing pressure may be carried out.

With respect to the plate materials that have been used in the direct engraving CTP method, various materials have been proposed such as those in which a hydrophobic elastomer (rubber) is used (see, for example, U.S. Pat. No. 5,798, 202, JP-A No. 2002-3665, Japanese Patent No. 3438404, JP-A Nos. 2004-262135 and 2001-121833.), or a hydrophilic polyvinyl alcohol derivative is used (see, for example, JP-A No. 2006-2061.) as a binder that determines the characteristics of the plate materials.

When a hydrophobic polymer or elastomer (rubber) is used as a binder polymer in a relief forming layer, the resulting relief layer has good water resistance and, therefore, is highly resistant to aqueous inks during printing. However, when a relief forming layer containing a hydrophobic binder polymer is laser engraved, scraps generated by engraving form a sticky liquid, and the sticky liquid frequently makes a simple rinse operation with tap water difficult.

As a technique for improving rinse characteristics of the scraps after engraving, a technique where porous inorganic particles are contained in a relief forming layer and the liquid scraps are adsorbed by the porous inorganic particles to improve removability has been proposed (see, for example, JP-A No. 2004-174758.).

DISCLOSURE OF INVENTION

The following <1> to <21> are exemplary embodiments of the invention.

<1> A resin composition for laser engraving, comprising: a compound (A) having at least one of a hydrolyzable silyl group or a silanol group; and a binder polymer (B) having a functional group capable of forming a crosslinked structure by reacting with at least one of a hydrolyzable silyl group or a silanol group.

<2> The resin composition for laser engraving of <1>, wherein the compound (A) having at least one of a hydrolyzable silyl group or a silanol group is a compound having two or more hydrolyzable silyl groups.

<3> The resin composition for laser engraving of <1> or <2>, wherein a hydrolyzable silyl group in the compound (A) having at least one of a hydrolyzable silyl group or a silanol group is a hydrolyzable silyl group where at least one of an alkoxy group or a halogen atom is directly bonded to a Si atom.

<4> The resin composition for laser engraving of any one of <1> to <3>, wherein the compound (A) having at least one of a hydrolyzable silyl group or a silanol group is a silane coupling agent.

<5> The resin composition for laser engraving of any one of <1> to <4>, wherein the functional group capable of forming a crosslinked structure by reacting with at least one of a hydrolyzable silyl group or a silanol group in the binder polymer (B) is at least one selected from the group consisting of a hydroxyl group, an alkoxy group, a silanol group and a hydrolyzable silyl group.

<6> The resin composition for laser engraving of <5>, wherein the functional group capable of forming a crosslinked structure by reacting with at least one of a hydrolyzable silyl group or a silanol group in the binder polymer (B) is a hydroxyl group.

<7> The resin composition for laser engraving of any one of <1> to <6>, wherein the binder polymer (B) has a glass transition temperature (Tg) of from 20° C. to less than 200° C.

<8> The resin composition for laser engraving of any one of <1> to <7>, wherein the binder polymer (B) is at least one selected from the group consisting of an acrylic resin, polyvinyl butyral and a derivative thereof.

<9> The resin composition for laser engraving of any one of <1> to <8>, wherein the binder polymer (B) is at least one selected from the group consisting of polyvinyl butyral and a derivative thereof.

<10> The resin composition for laser engraving of any one of <1> to <9>, further comprising a catalyst (C) for alcohol exchange reaction.

<11> The resin composition for laser engraving of any one of <1> to <10>, further comprising a polymerizable compound (D).

<12> The resin composition for laser engraving of any one of <1> to <11>, further comprising a polymerization initiator (E).

<13> The resin composition for laser engraving of any one of <1> to <12>, further comprising a photothermal converter (F) capable of absorbing light having a wavelength of from 700 to 1300 nm.

<14> A relief printing plate precursor for laser engraving comprising a relief forming layer that is formed from the resin composition for laser engraving of any one of <1> to <13> and has a crosslinked structure formed by the compound (A) having at least one of a hydrolyzable silyl group or a silanol group and the binder polymer (B) having a functional group capable of forming a crosslinked structure by reacting with at least one of a hydrolyzable silyl group or a silanol group.

<15> A relief printing plate precursor for laser engraving comprising a relief forming layer having a crosslinked structure formed by crosslinking a resin composition layer for laser engraving comprising the resin composition for laser engraving of any one of <1> to <13> by light and/or heat.

<16> A method for producing a relief printing plate precursor for laser engraving comprising in this order: (1) forming a resin composition layer for laser engraving comprising the resin composition for laser engraving of any one of <1> to <13>; and (2) crosslinking the resin composition layer for laser engraving by light and/or heat to form a crosslinked relief forming layer.

<17> The method for producing a relief printing plate precursor for laser engraving of <16>, wherein the step (2) comprises crosslinking the resin composition layer for laser engraving by heat.

<18> A method for producing a relief printing plate comprising in this order: (1) forming a resin composition layer for laser engraving comprising the resin composition for laser engraving of any one of <1> to <13>; (2) crosslinking the resin composition layer for laser engraving by light and/or heat to form a crosslinked relief forming layer; and (3) forming a relief layer by laser engraving the crosslinked relief forming layer.

<19> A relief printing plate comprising a relief layer produced by the method for producing a relief printing plate of <18>.

<20> The relief printing plate of <19>, wherein a thickness of the relief layer is from 0.05 mm to 10 mm.

<21> The relief printing plate of <19>, wherein a Shore A hardness of the relief layer is from 50° to 90°.

According to the invention, a resin composition for laser engraving may be provided which may be preferably used with an aqueous ink during printing, is excellent in rinse characteristics of engraving scraps generated by laser engraving, and is preferably used for a relief forming layer of a relief printing plate precursor for laser engraving.

Furthermore, according to the invention, by use of a resin composition for laser engraving of the invention, a relief printing plate precursor excellent in rinse characteristics of the engraving scraps and excellent in elasticity and ink transferability of a formed relief layer; a method for producing a relief printing plate therefrom; and a relief printing plate obtained thereby may be provided.

BEST MODE FOR CARRYING OUT THE INVENTION

In what follows, the present invention will be detailed.

[Resin Composition for Laser Engraving]

A resin composition for laser engraving of the invention includes a compound (A) having at least one of a hydrolyzable silyl group or a silanol group, and a binder polymer (B) having a functional group capable of forming a crosslinked structure by reacting with at least one of a hydrolyzable silyl group or a silanol group.

The resin composition for laser engraving, which may be used for a printing plate of the invention, is, when subjected to laser engraving, high in engraving sensitivity and excellent in rinse characteristics of engraving scraps; accordingly, a time for forming a relief layer and forming a plate may be shortened. The resin composition of the invention having such characteristics may be used in, other than an application for forming a relief forming layer of a relief printing plate precursor on which laser engraving is performed, a wide range of applications without particular restriction. For example, the resin composition of the invention may be used to form not only a relief forming layer of a printing plate precursor on which a convex relief is formed by laser engraving as detailed below but also other material forms on a surface of which concavities and convexities or openings are formed, such as various printing plates or molded bodies on which an image is formed by laser engraving, such as intaglio printing plates, porous printing plates, and stamps.

Among these, the resin composition of the invention is preferably used to form a relief forming layer provided on a suitable support.

In the present specification, when a relief printing plate precursor is explained, a layer having a flat surface that is an image forming layer that contains a binder polymer and will be subjected to laser engraving is referred to as a relief forming layer, and a layer on a surface of which concavities and convexities have been formed by laser engraving is referred to as a relief layer.

In what follows, components of a resin composition for laser engraving will be described.

<(A) Compound Having at Least One of Hydrolyzable Silyl Group or Silanol Group>

A "hydrolyzable silyl group" in a compound (A) having at least one of a hydrolyzable silyl group or a silanol group [hereinafter, appropriately referred to as "compound (A)"] used in a resin composition for laser engraving of the invention is a silyl group containing a hydrolyzable group. Examples of the hydrolyzable group include an alkoxy group, an aryloxy group, a mercapto group, a halogen group, an amide group, an acetoxy group, an amino group, and an isopropenoxy group. The silyl group is hydrolyzed to a silanol group, and the silanol group is dehydrated and condensed to generate a siloxane bond. The hydrolyzable silyl group or the silanol group is preferably represented by a formula (1) shown below.

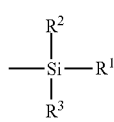
(1)

In the formula (1), $R^1$ to $R^3$ each independently represent a hydrolyzable group selected from the group consisting of an alkoxy group, an aryloxy group, a mercapto group, a halogen atom, an amide group, an acetoxy group, an amino group, and an isopropenoxy group, a hydroxyl group, a hydrogen atom, or a monovalent organic group. However, at least one of $R^1$ to $R^3$ represents a hydrolyzable group selected from the group consisting of an alkoxy group, an aryloxy group, a mercapto group, a halogen atom, an amide group, an acetoxy group, an amino group, and an isopropenoxy group, or a hydroxyl group.

When any of $R^1$ to $R^3$ represents a monovalent organic group, the organic group is preferably an alkyl group having 1 to 30 carbon atoms, from the viewpoint of imparting solubility in various organic solvents to the compound.

In the formula (1), a hydrolyzable group bonded to a silicon atom is particularly preferably an alkoxy group or a halogen atom.

The alkoxy group is an alkoxy group having preferably 1 to 30 carbon atoms, more preferably 1 to 15 carbon atoms, particularly preferably 1 to 5 carbon atoms, and still more preferably 1 to 3 carbon atoms, from the viewpoint of rinse characteristics and printing durability.

Furthermore, examples of the halogen atom include a F atom, a Cl atom, a Br atom, and an I atom, and a Cl atom and a Br atom are preferred and a Cl atom is more preferred from the viewpoint of easy synthesis and stability.

In the invention, "a compound (A) having at least one of a hydrolyzable silyl group or a silanol group" is preferably a compound having at least one group represented by the formula (1), and more preferably a compound having at least two groups represented by the formula (1). In particular, a compound having at least two hydrolyzable silyl groups is preferably used. That is, a compound having two or more silicon atoms in a molecule is preferably used. The number of silicon atoms contained in a compound is preferably 2 or more but 6 or less and most preferably 2 or 3.

One to three hydrolyzable groups may be bonded to one silicon atom. The total number of the hydrolyzable groups in the formula (1) is preferably 2 or 3. Particularly preferably, three hydrolyzable groups are bonded to a silicon atom. When two or more hydrolyzable groups are bonded to a silicon atom, the two or more hydrolyzable groups may be same or different from each other.

Examples of the alkoxy group include specifically, for example, a methoxy group, an ethoxy group, a propoxy group, an isopropoxy group, a butoxy group, a tert-butoxy group, a benzyloxy group. Examples of an alkoxysilyl group, in which an alkoxy group is bonded to a silicon atom, include, for example, a trialkoxysilyl group such as a trimethoxysilyl group, a triethoxysilyl group, and a triisopropoxysilyl group; a dimethoxysilyl group such as a dimethoxymethylsilyl a diethoxymethylsilyl group; and a monoalkoxysilyl group such as a methoxydimethylsilyl group, an ethoxydimethylsilyl group. A plurality of same or different alkoxy groups described above may be combined.

Examples of the aryloxy group include a phenoxy group. Examples of an aryloxysilyl group, in which an aryloxy group is bonded to a silicon atom, include a triaryloxysilyl group such as triphenoxysilyl group.

Preferable examples of the compound (A) in the invention include compounds where plural groups represented by the formula (1) are bonded through a linking group, and as the linking group, a linking group having a sulfide group, an imino group or an ureylene group is preferred from the viewpoint of effects.

A typical synthesis method of the compound (A) containing a linking group having the specific structure will be shown below.

(Method for Synthesizing Compound Having at Least One of Hydrolyzable Silyl Group or Silanol Group and Having Linking Group Having Sulfide Group)

A method for synthesizing a compound (A) having a linking group having a sulfide group (hereinafter, appropriately referred to as "sulfide linking group-containing compound (A)") is not restricted to particular one. Examples thereof specifically include, for example, a synthesis method involving a reaction selected from a reaction between a compound (A) having a halogenated hydrocarbon group and alkali sulfide, a reaction between a compound (A) having a mercapto group and a halogenated hydrocarbon, a reaction between a compound (A) having a mercapto group and a compound (A) having a halogenated hydrocarbon group, a reaction between a compound (A) having a halogenated hydrocarbon group and mercaptans, a reaction between a compound (A) having an ethylenically unsaturated double bond and mercaptans, a reaction between a compound (A) having an ethylenically unsaturated double bond and a compound (A) having a mercapto group, a reaction between a compound having an ethylenically unsaturated double bond and a compound (A) having a mercapto group, a reaction between ketones and a compound (A) having a mercapto group, a reaction between a diazonium salt and a compound (A) having a mercapto group, a reaction between a compound (A) having a mercapto group and oxiranes, a reaction between a compound (A) having a mercapto group and a compound (A) having an oxirane group, a reaction between mercaptans and a compound (A) having an oxirane group, a reaction between a compound (A) having a mercapto group and aziridines, and the like.

(Method for Synthesizing Compound Having at Least One of Hydrolyzable Silyl Group or Silanol Group and Having Linking Group Having Imino Group)

A method for synthesizing a compound having at least one of a hydrolyzable silyl group or a silanol group and having a linking group having an imino group (hereinafter, appropriately referred to as "imino linking group-containing compound (A)") is not particularly restricted. Examples thereof specifically include, for example, a synthesis method involving a reaction selected from a reaction between a compound (A) having an amino group and a halogenated hydrocarbon, a reaction between a compound (A) having an amino group and a compound (A) having a halogenated hydrocarbon group, a reaction between a compound (A) having a halogenated hydrocarbon group and amines, a reaction between a compound (A) having an amino group and oxiranes, a reaction between a compound (A) having an amino group and a compound (A) having an oxirane group, a reaction between amines and a compound (A) having an oxirane group, a reaction between a compound (A) having an amino group and aziridines, a reaction between a compound (A) having an ethylenically unsaturated double bond and amines, a reaction between a compound (A) having an ethylenically unsaturated double bond and a compound (A) having an amino group, a reaction between a compound having an ethylenically unsaturated double bond and a compound (A) having an amino group, a reaction between a compound having an acetylenically unsaturated triple bond and a compound (A) having an amino group, a reaction between a compound (A) having an iminic unsaturated double bond and an organic alkali metal compound, a reaction between a compound (A) having an iminic unsaturated double bond and an organic alkaline earth metal compound, a reaction between a carbonyl compound and a compound (A) having an amino group, and the like.

(Method for Synthesizing Compound Having at Least One of Hydrolyzable Silyl Group or Silanol Group and Having Linking Group Having Ureylene Group)

A method for synthesizing a compound having at least one of a hydrolyzable silyl group or a silanol group and having a linking group having an ureylene group (hereinafter, appropriately referred to as "ureylene linking group-containing compound (A)") is not particularly restricted. Examples thereof include, specifically, for example, a synthesis method involving a reaction selected from a reaction between a compound (A) having an amino group and isocyanic acid esters, a reaction between a compound (A) having an amino group and a compound (A) having an isocyanic acid ester, a reaction between amines and a compound (A) having an isocyanic acid ester, and the like.

As the compound (A) in the invention, a silane coupling agent (A-1) may be preferably used.

(A-1) Silane Coupling Agent

In what follows, a silane coupling agent (A-1) preferable as a compound (A) in the invention will be described.

In the invention, a functional group having at least one of an alkoxy group or a halogen group directly bonded to a Si atom is called a silane coupling group, and a compound having one or more silane coupling groups in a molecule is called a silane coupling agent. The silane coupling group has preferably two or more alkoxy groups or halogen atoms directly bonded to a Si atom, and particularly preferably three or more alkoxy groups or halogen atoms directly bonded to a Si atom.

In a resin composition of the invention, at least one of a hydrolyzable silyl group or a silanol group in the compound (A), preferably a silane coupling group in a silane coupling agent (A-1), when a reactive functional group in a binder polymer (B) is, for example, a hydroxyl group (—OH), causes an alcohol exchange reaction with the hydroxyl group to form a crosslinked structure. As a result, molecules of the binder polymer are mutually three-dimensionally crosslinked via the silane coupling agent. A reactive functional group in the binder polymer (B), which may form a crosslinked structure by reacting with at least one of the hydrolyzable silyl group or the silanol group in the compound (A), will be detailed below.

A silane coupling agent (A-1), which is a preferable embodiment in the invention, should have, as a functional group directly bonded to a Si atom, at least one of an alkoxy group or a halogen atom, and a compound having an alkoxy group is preferred from the viewpoint of easy handling of the compound.

Herein, the alkoxy group is preferably an alkoxy group having 1 to 30 carbon atoms from the viewpoint of rinse characteristics and printing durability. The alkoxy group has more preferably 1 to 15 carbon atoms and particularly preferably 1 to 5 carbon atoms.

Furthermore, examples of the halogen atom include a F atom, a Cl atom, a Br atom, and an I atom. From the viewpoint of easy synthesis and stability, a Cl atom and a Br atom are preferred and a Cl atom is more preferred.

The silane coupling agent in the invention contains preferably 1 or more but 10 or less, more preferably 1 or more but 5 or less and particularly preferably 2 or more but 4 or less silane coupling groups in a molecule, from the viewpoint of keeping good balance between a degree of crosslinking and flexibility of a film.

When two or more silane coupling groups are contained, the silane coupling groups are preferably linked to each other via a linking group. As the linking group, a bivalent or more organic group that may have a substituent such as a heteroatom or a hydrocarbon is exemplified. From the viewpoint of high engraving sensitivity, a linking group containing a heteroatom (N, S, O) is preferred, and a linking group containing a S atom is particularly preferred.

From the above viewpoint, the silane coupling agent in the invention is preferably a compound having in a molecule two silane coupling groups having a methoxy group or an ethoxy group (particularly a methoxy group) bonded to a Si atom, in which these silane coupling groups are bonded to each other via an alkylene group containing a heteroatom (particularly preferably S atom). More specifically, a silane coupling agent that has a linking group containing a sulfide group is preferred.

As another preferable linking group that links silane coupling groups, a linking group having an oxyalkylene group is exemplified. When the linking group includes an oxyalkylene group, the rinse characteristics of the engraving scraps after laser engraving may be improved. The oxyalkylene group is preferably an oxyethylene group, and more preferably a polyoxyethylene chain, in which plural oxyethylene groups are linked. The total number of the oxyethylene groups in the polyoxyethylene chain is preferably 2 to 50, more preferably 3 to 30, and particularly preferably 4 to 15.

Specific examples of silane coupling agents which may be used in the invention are shown below. Examples of the silane coupling agents in the invention include, for example, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, γ-mercaptopropyltrimethoxysilane, γ-mercaptopropyltriethoxysilane, bis(triethoxysilylpropyl)disulfide, bis(triethoxysilylpropyl)tetrasulfide, 1,4-bis(triethoxysilyl)benzene, bis(triethoxysilyl)ethane, 1,6-bis(trimethoxysilyl)hexane, 1,8-bis(triethoxysilyl)octane, 1,2-bis(trimethoxysilyl)decane, bis(triethoxysilylpropyl)amine, bis(trimethoxysilylpropyl)urea, γ-chloropropyltrimethoxysilane, γ-ureidopropyltriethoxysilane. In addition to the above mentioned silane coupling agents, compounds represented by formulas shown below are preferably exemplified. However, the invention is not restricted to these compounds.

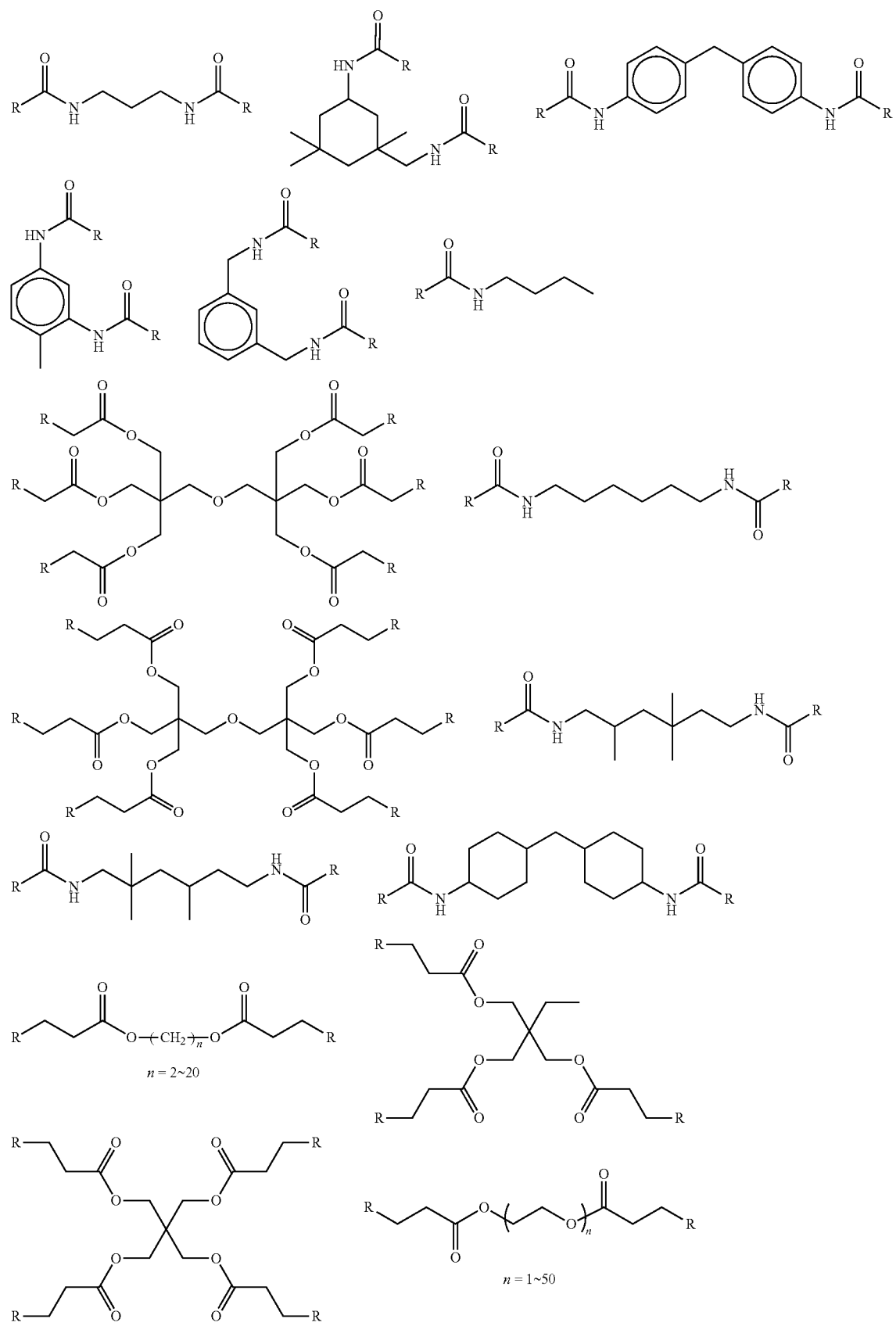

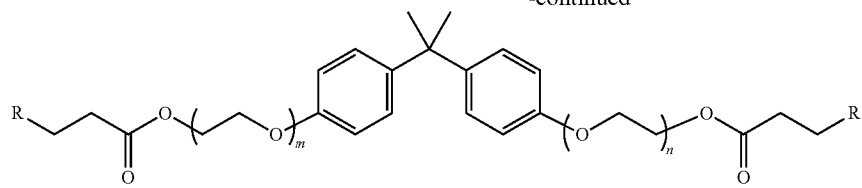
$m + n = 2~50$
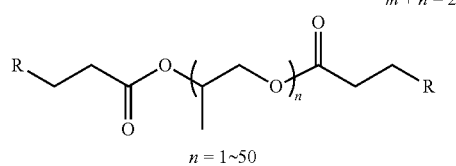
$n = 1~50$
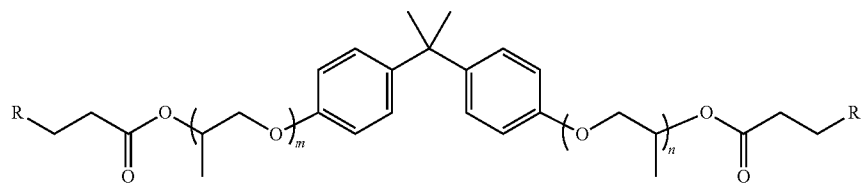
$m + n = 2~50$
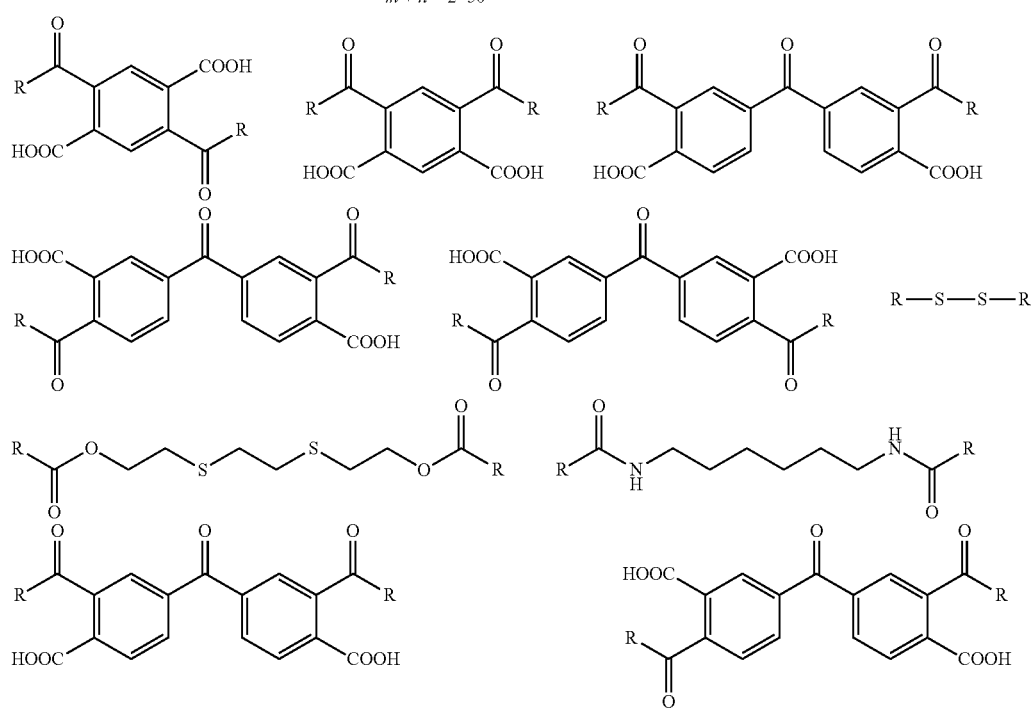
In the above respective formulas, R represents a partial structure selected from structures shown below. When plural Rs and R¹s are present in a molecule, these may be same or different from each other. However, these are preferably same from the viewpoint of synthesis suitability.
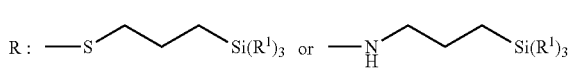
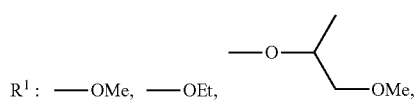
-continued
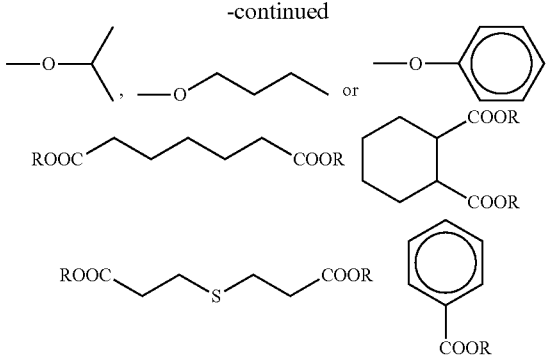

-continued

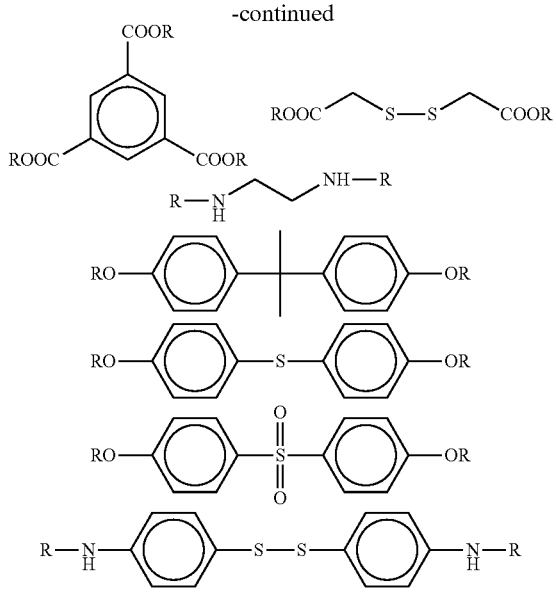

In the above respective formulas, R represents a partial structure shown below. $R^1$ is the same as mentioned above. When plural Rs and $R^1$s are present in a molecule, these may be same or different from each other. However, these are preferably same from the viewpoint of synthesis suitability.

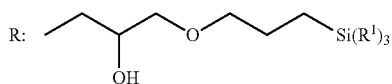

The compound (A) may be obtained by appropriately synthesizing. However, commercially available products are preferably used from the viewpoint of cost. Commercially available products such as silane products and silane coupling agents available from Shin-Etsu Chemical Co., Ltd., Dow Corning Toray Silicones Co., Ltd., Momentive Performance Materials, Inc., Chisso Corporation correspond to the compound (A). Accordingly, for a composition of the invention, these commercially available products may be appropriately selected and used in accordance with the object.

As the silane coupling agent in the invention, other than the compounds mentioned above, a partially hydrolyzed condensate obtained from one silane and a partially co-hydrolyzed condensate obtained from two or more kinds of silanes may be used. Hereinafter, these compounds are referred to as "partially (co)hydrolyzed condensate" in some cases.

Specific examples of the partially (co)hydrolyzed condensate include partially (co)hydrolyzed condensates obtained by using, as a precursor, one or more selected from silane compounds including alkoxysilanes such as tetramethoxysilane, tetraethoxysilane, methyltrimethoxysilane, methyltriethoxysilane, methyltriisopropoxysilane, methyltriacetoxysilane, methyltris(methoxyethoxy)silane, methyltris(methoxypropoxy)silane, ethyltrimethoxysilane, propyltrimethoxysilane, butyltrimethoxysilane, hexyltrimethoxysilane, octyltrimethoxysilane, decyltrimethoxysilane, cyclohexyltrimethoxysilane, phenyltrimethoxysilane, phenyltriethoxysilane, tolyltrimethoxysilane, chloromethyltrimethoxysilane, γ-chloropropyltrimethoxysilane, 3,3,3-trifluoropropyltrimethoxysilane, cyanoethyltriethoxysilane, γ-glycidoxypropyltrimethoxysilane, γ-glycidoxypropyltriethoxysilane, β-(3,4-epoxycyclohexyl)ethyltrimethoxysilane, γ-aminopropyltrimethoxysilane, γ-aminopropyltriethoxysilane, N-β(aminoethyl)γ-aminopropyltrimethoxysilane, N-phenyl-γ-aminopropyltrimethoxysilane, γ-mercaptopropyltrimethoxysilane, dimethyldimethoxysilane, dimethyldiethoxysilane, diethyldimethoxysilane, methylethyldimethoxysilane, methylpropyldimethoxysilane, diphenyldimethoxysilane, diphenyldiethoxysilane, methylphenyldimethoxysilane, γ-chloropropylmethyldimethoxysilane, 3,3,3-trifluoropropylmethyldimethoxysilane, γ-glycidoxypropylmethyldiethoxysilane, γ-aminopropylmethyldiethoxysilane, N-β(aminoethyl)γ-aminopropylmethyldimethoxysilane, and γ-mercaptopropylmethyldiethoxysilane, and acyloxysilanes such as acetyloxysilane and ethoxalyloxysilane.

Among the silane compounds as a precursor of the partially (co)hydrolyzed condensate, silane compounds having a substituent selected from a methyl group and a phenyl group as a substituent on a silicon atom are preferred from the viewpoint of general versatility, cost and compatibility of a film. Preferable examples of the silane compound as the precursor specifically include methyltrimethoxysilane, methyltriethoxysilane, phenyltrimethoxysilane, phenyltriethoxysilane, dimethyldimethoxysilane, dimethyldiethoxysilane, diphenyldimethoxysilane, and diphenyldiethoxysilane.

In this case, as the partially (co)hydrolyzed condensate, dimer (disiloxane unit obtained by reacting 1 mole of water with 2 moles of silane compound to eliminate 2 moles of alcohol) to 100 mer, preferably dimer to 50 mer and more preferably dimer to 30 mer of the silane compounds such as mentioned above may be suitably used. Furthermore, a partially (co)hydrolyzed condensate obtained from two or more kinds of silane compounds as a raw material may be used.

As such a partially (co)hydrolyzed condensate, commercially available silicon alkoxy oligomers (for example, ones commercially available from Shin-Etsu Chemical Co., Ltd.) or products produced according to an ordinary method in such a manner that hydrolyzing water less than equivalent to a hydrolyzable silane compound is reacted with the hydrolyzable silane compound and thereafter by-products such as alcohol or hydrochloric acid are removed may be used. At the time of production, when, as a raw material hydrolyzable silane compound that is a precursor, for example, alkoxysilanes or acyloxysilanes as mentioned above are used, the alkoxysilanes or acyloxysilanes may be partially hydrolyzed and condensed with an acid such as hydrochloric acid or sulfuric acid, a hydroxide of alkali metal or alkaline earth metal such as sodium hydroxide or potassium hydroxide, or an alkaline organic substance such as triethylamine as a reaction catalyst. When the partially (co)hydrolyzed condensates are directly produced from chlorosilanes, water and alcohol may be reacted with the chlorosilanes using by-product hydrochloric acid as a catalyst.

The compounds (A), preferably the silane coupling agents (A-1) in the resin composition of the invention may be used singly or in a combination of two or more kinds thereof.

Content of the compound (A) in the resin composition of the invention is, in terms of solid content, preferably in the range of 0.1% by mass to 80% by mass, more preferably in the range of 1% by mass to 40% by mass, and most preferably in the range of 5% by mass to 30% by mass.

<(B) Binder Polymer Having Functional Group Capable of Forming Crosslinked Structure by Reacting with at Least One of Hydrolyzable Silyl Group or Silanol Group>

The resin composition of the invention contains a binder polymer [hereinafter, appropriately, referred to as polymer (B)] containing in a molecule a functional group (hereinafter, appropriately referred to as "reactive functional group") capable of forming a crosslinked structure by reacting with at least one of a hydrolyzable silyl group or a silanol group contained in the compound (A).

The reactive functional group capable of reacting with the compound (A) is not particularly restricted as long as the reactive functional group is capable of forming a —Si-β-bond by reacting with at least one of a hydrolyzable silyl group or a silanol group that the compound (A) has. Examples of preferable reactive functional group include a hydroxyl group, an alkoxy group, a silanol group and a hydrolyzable silyl group.

These functional groups may be present anywhere in a polymer molecule. However, the functional groups are preferably present particularly in a side chain of a polymer chain. As such polymers, vinyl copolymers (copolymers of vinyl monomers such as polyvinyl alcohol and polyvinyl acetal, and derivatives thereof) and acrylic resins (copolymers of acrylic monomers such as hydroxyethyl (meth)acrylate, and derivatives thereof) are preferably used. The derivatives of the copolymers of vinyl monomers are specifically binder polymers in which a OH group or a position of a OH group in the vinyl alcohol unit is chemically modified to elongate the side chain, and a functional group capable of reacting with a compound (A), such as a OH group or a carboxyl group, is introduced to the terminal position of the elongated side chain. The derivatives of the copolymers of acrylic monomers may be copolymers in which a functional group capable of reacting with a compound (A), such as a OH group or a carboxyl group, is introduced.

A method for producing the polymer (B) usable in the invention is not restricted to a particular method. A method for producing by polymerizing or copolymerizing polymerizable monomers having a group capable of forming a crosslinked structure by reacting with at least any one of a hydrolyzable silyl group or a silanol group is exemplified.

Such a polymer (B) is particularly preferably a binder polymer (B-1) having a hydroxyl group.

(B-1) Binder Polymer Having Hydroxyl Group

In what follows, a binder polymer (B-1) having a hydroxyl group suitable as the polymer (B) in the resin composition of the invention (hereinafter, appropriately referred to as "specified polymer (B-1)") will be described. The binder polymer is preferably a binder polymer insoluble in water and soluble in alcohol having 1 to 4 carbon atoms.

Examples of the specified polymer (B-1) in the invention include polyvinyl butyral (PVB) and derivatives thereof, acrylic resins having a hydroxyl group in a side chain, and epoxy resins having a hydroxyl group in a side chain, from the viewpoint of high engraving sensitivity and excellent film property as well as balanced aqueous ink suitability and UV-ink suitability.

The specified polymer (B-1) usable in the invention, when combined with a photothermal converter (F) (which will be described below) that is capable of absorbing light having a wavelength of from 700 nm to 1300 nm and is a preferable additional component of a resin composition for laser engraving that may be used to form a relief forming layer in the invention, preferably has a glass transition temperature (Tg) of 20° C. or more, because the engraving sensitivity may be improved. The binder polymer having such a glass transition temperature is hereinafter referred to as a non-elastomer. That is, an "elastomer" is defined in the field of science as a polymer having a glass transition temperature not higher than the normal temperature (Kagaku Daijiten, the second edition, edited by Foundation for Advancement of International Science, published by Maruzen Co., Ltd., p. 154). Accordingly, a "non-elastomer" is a polymer having a glass transition temperature higher than the normal temperature. The upper limit of the glass transition temperature of the binder polymer is not particularly restricted. However, the glass transition temperature of the binder polymer is preferably 200° C. or less, from the viewpoint of a handling property, and more preferably 25° C. or more but 120° C. or less.

In the case of a polymer having a glass transition temperature of room temperature (20° C.) or more being used, the specified polymer (B-1) is in a glass state at normal temperature and, compared with the case of a polymer in a rubber state, a thermal molecular movement is rather restricted. In the laser engraving, during laser irradiation, in addition to heat imparted by infrared laser, heat generated by a function of the photothermal converter (F) used together as required is transmitted to the specified polymer (B-1) present in the vicinity, and the specified polymer (B-1) is pyrolyzed and dissipated, resulting in engraving and forming concavities.

In a preferable embodiment of the invention, when the photothermal converter (F) is present in a state where a thermal molecular movement of the specified polymer (B-1) is suppressed, a thermal transmission to the specified polymer (B-1) and thermal decomposition are considered to be caused effectively. Because of such an effect, the engraving sensitivity is considered to be further increased.

Specific examples of the non-elastomer that is a particularly preferable embodiment of the specified polymer (B-1) preferably used in the invention will be exemplified below.

(1) Polyvinyl Acetal Derivative

In the specification, in what follows, polyvinyl acetal and derivatives thereof are simply referred to as polyvinyl acetal derivative. That is, in the specification, the term "polyvinyl acetal derivative" is used as a concept containing polyvinyl acetal and derivatives thereof and generically represents compounds obtained by cyclic acetalization of polyvinyl alcohol (obtained by saponifying polyvinyl acetate).

Acetal content in a polyvinyl acetal derivative (mole % of acetalized vinyl alcohol units with respect to the total mole number (100 mole %) of raw material vinyl acetate monomer) is preferably from 30% to 90%, more preferably from 50% to 85% and particularly preferably from 55% to 78%.

The vinyl alcohol units in the polyvinyl acetal derivative is, relative to the total number of moles of raw material vinyl acetate monomers, preferably from 10 mole % to 70 mole %, more preferably from 15 mole % to 50 mole %, and particularly preferably from 22 mole % to 45 mole %.

The polyvinyl acetal derivative may have a vinyl acetate unit as other components and the content thereof is preferably 0.01 to 20 mole %, and more preferably 0.1 to 10 mole %. The polyvinyl acetal derivative may further have other copolymer unit.

Examples of the polyvinyl acetal derivative include a polyvinyl butyral derivative, a polyvinyl propylal derivative, a polyvinyl ethylal derivative, a polyvinyl methylal derivative, among these, a polyvinyl butyral derivative (hereinafter, referred to as PVB derivative) being preferred. In the description thereof as well, for example, the term "polyvinyl butyral derivative" is used, in the specification, in the meaning to contain polyvinyl butyral and derivatives thereof, and this is applied to other polyvinyl acetal derivatives.

A weight average molecular weight of the polyvinyl acetal derivative is preferably from 5000 to 800000 and more preferably from 8000 to 500000 from the viewpoint of keeping balance between the engraving sensitivity and a film property. Furthermore, from the viewpoint of improving rinse characteristics of engraving scraps, the weight average molecular weight is particularly preferably from 50000 to 300000.

In what follows, as a particularly preferable example of polyvinyl acetal derivatives, polyvinyl butyral derivatives will be exemplified and described without particularly restricting thereto.

A structure of a polyvinyl butyral derivative is as shown below and configured containing these structural units.

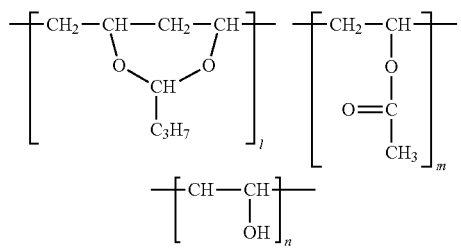

The PVB derivatives are commercially available and preferable specific examples thereof include "S-LEC B" series and "S-LEC K (KS)" series (trade name, manufactured by Sekisui Chemical Co., Ltd.) and "DENKA BUTYRAL" (trade name, manufactured by Denki Kagaku Kogyo Co., Ltd.) from the viewpoint of alcohol solubility (particularly ethanol solubility). More preferably, from the viewpoint of alcohol solubility (particularly ethanol solubility), "S-LEC B" series (trade name, manufactured by Sekisui Chemical Co., Ltd.) and "DENKA BUTYRAL" (trade name, manufactured by Denki Kagaku Kogyo Co., Ltd) are exemplified, and particularly preferably "BL-1" (l=61, m=3, n=36 in the above chemical formula, weight average molecular weight: 19000), "BL-1H" (l=67, m=3, n=30, weight average molecular weight: 20000), "BL-2" (l=61, m=3, n=36, weight average molecular weight: about 27000), "BL-5" (l=75, m=4, n=21, weight average molecular weight: 32000), "BL-S" (l=74, m=4, n=22, weight average molecular weight: 23000), "BM-S" (l=73, m=5, n=22, weight average molecular weight: 53000) and "BH-S" (l=73, m=5, n=22, weight average molecular weight: 66000) among the "S-LEC B" series (trade name, manufactured by Sekisui Chemical Co., Ltd.), and "#3000-1" (l=71, m=1, n=28 in the above chemical formula, weight average molecular weight: 74000), "#3000-2" (l=71, m=1, n=28, weight average molecular weight: 90000), "#3000-4" (l=71, m=1, n=28, weight average molecular weight: 117000), "#4000-2" (l=71, m=1, n=28, weight average molecular weight: 152000), "#6000-C" (l=64, m=1, n=35, weight average molecular weight: 308000), "#6000-EP" (l=56, m=15, n=29, weight average molecular weight: 381000), "#6000-CS" (l=74, m=1, n=25, weight average molecular weight: 322000) and "#6000-AS" (l=73, m=1, n=26, weight average molecular weight: 242000) among DENKA BUTYRAL series (trade name, manufactured by Denki Kagaku Kogyo Co., Ltd.) are exemplified.

When a relief forming layer is formed using the PVB derivative as the specified polymer (B-1), a method where a solution obtained by dissolving it in a solvent is cast and dried is preferably used from the viewpoint of smoothness of a surface of a film.

(2) Acrylic Resin

As an acrylic resin usable as the specified polymer (B-1) in the invention, an acrylic resin which is obtained from a known acrylic monomer and has a hydroxyl group in a molecule may be used.

Preferable examples of acrylic monomer usable in a synthesis of an acrylic resin having a hydroxyl group include, for example, (meth)acrylic acid esters, crotonic acid esters and (meth)acrylamides which have a hydroxyl group in a molecule. Specific examples of such monomers include, for example, 2-hydroxyethyl (meth)acrylate, 2-hydroxypropyl (meth)acrylate, 4-hydroxybutyl (meth)acrylate.

The acrylic resin may contain, as a copolymerizing component, an acrylic monomer other than an acrylic monomer having a hydroxyl group. Examples of such acrylic monomer include, as (meth)acrylic acid esters, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, 2-ethylhexyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, cyclohexyl (meth)acrylate, benzyl (meth)acrylate, diethylene glycol monomethyl ether (meth)acrylate, diethylene glycol monoethyl ether (meth)acrylate, diethylene glycol monophenyl ether (meth)acrylate, triethylene glycol monomethyl ether (meth)acrylate, triethylene glycol monoethyl ether (meth)acrylate, dipropylene glycol monomethyl ether (meth)acrylate, polyethylene glycol monomethyl ether (meth)acrylate, polypropylene glycol monomethyl ether (meth)acrylate, monomethyl ether (meth)acrylate of a copolymer of ethylene glycol and propylene glycol, N,N-dimethylaminoethyl (meth)acrylate, N,N-diethylaminoethyl (meth)acrylate, N,N-dimethylaminopropyl (meth)acrylate.

Furthermore, modified acrylic resins formed by using an acrylic monomer having a urethane group or a urea group may also be preferably used.

Among these, alkyl (meth)acrylates such as lauryl (meth)acrylate and (meth)acrylates having an aliphatic ring structure such as t-butylcyclohexyl methacrylate are particularly preferred from the viewpoint of aqueous ink durability.

As the specified polymer (B-1), novolak resins obtained by condensing phenols and aldehydes under an acidic condition may be used.

Examples of preferable novolak resins include, for example, novolak resins obtained from phenol and formaldehyde, novolak resins obtained from m-cresol and formaldehyde, novolak resins obtained from p-cresol and formaldehyde, novolak resins obtained from o-cresol and formaldehyde, novolak resins obtained from octyl phenol and formaldehyde, novolak resins obtained from m-/p-mixed cresol and formaldehyde, novolak resins obtained from a mixture of phenol/cresol (any one of m-, p-, o- or m-/p-, m-/o-, o-/p-mixture may be used) and formaldehyde.

The novolak resins preferably have a weight average molecular weight of from 800 to 200,000 and a number average molecular weight of from 400 to 60,000.

As the specified polymer (B-1), an epoxy resin having a hydroxyl group in a side chain may be used. Preferable specific example thereof include epoxy resins obtained by polymerizing an adduct of bisphenol A and epichlorohydrin as a raw material monomer.

The epoxy resins preferably have a weight average molecular weight of from 800 to 200,000 and a number average molecular weight of from 400 to 60,000.

Among the specified polymers (B-1), polyvinyl butyral derivatives are particularly preferred from the viewpoint of rinse characteristics and printing durability when a relief forming layer is formed.

Content of hydroxyl groups in the polymer (B) in the invention is, for the polymers in the above embodiments, preferably from 0.1 to 15 mmol/g and more preferably from 0.5 to 7 mmol/g.

The polymers (B) such as the specified polymers (B-1) in the resin compositions in the invention may be used singly or in a combination of two or more kinds.

Preferable content of the polymer (B) in the resin composition usable in the invention is, relative to a total solid content, preferably from 2 to 95% by mass, more preferably from 5 to 80% by mass and particularly preferably from 10 to 60% by mass, from the viewpoint of satisfying shape-maintaining property, water resistance and engraving sensitivity of a coated film with excellent balance.

The mechanism of the action when the compound (A) and the polymer (B) are used together in the resin composition of the invention will be described with a silane coupling agent (A-1) and a specified polymer (B-1) being exemplified as an example. The mechanism of the action is not definite but is considered as shown below.

In the resin composition, a silane coupling group of the silane coupling agent (A-1) causes an alcohol exchange reaction with a hydroxyl group (—OH) in the coexisting specified polymer (B-1) to result in three-dimensionally crosslinked molecules of the specified polymer (B-1) by a silane coupling agent. As a result, (I) engraving scraps generated by laser engraving become powdery from liquid and thereby may be readily removed by flowing tap water, that is, rinse characteristics are improved, and (II) when a resin composition is formed into a film, elasticity of the film is improved and thereby plastic deformation is difficult to occur. The (II) improvement in the film elasticity, when the resin composition of the invention is applied to a relief forming layer, leads to improvement in ink transferability and printing durability of a formed printing plate. Furthermore, in a preferable embodiment of the invention, in the case where a heteroatom is included in a linking group that links silane coupling groups in the silane coupling agent, owing to the heteroatom, (III) engraving sensitivity is improved. An improvement in the sensitivity is remarkable in particular when an S atom is contained as a heteroatom.

As to (I) an improvement in the rinse characteristics, since binder molecules are crosslinked with the silane coupling agent to result in a larger molecular weight of the polymer compound included in a film made of the resin composition before engraving, the scraps generated by laser engraving become powdery scraps in which stickiness caused by a liquid component having a low molecular weight is inhibited, and thereby the rinse characteristics enabling easy removal with tap water are considered to be obtained. Furthermore, it is considered that molecules of the specified polymer (B-1) are mutually directly crosslinked via the silane coupling agent (A-1) to form a three dimensionally crosslinked structure in a molecule and satisfy rubber elasticity developing requisite, and thereby an apparent rubber-like behavior is shown and the (II) an improvement in the film elasticity is obtained. Accordingly, it is considered that in the case where the resin composition of the invention is formed in film to form a relief forming layer, the film elasticity of the resulting relief layer is improved, thereby even when printing pressure is repeatedly applied in printing over a long time, the plastic deformation is suppressed, and thereby excellent ink transferability is realized and printing durability is also improved.

When the silane coupling agent (A-1) has a linking group having a heteroatom that is bonded to a carbon atom in a molecule, the heteroatom and the adjacent carbon atom, which are an electronic state where covalent electrons are deviated toward the heteroatom, are likely to be energetically cleaved. As a result, the resin composition tends to be thermally decomposed by laser engraving and thereby the (III) engraving sensitivity is considered to be improved.

Thus, in the resin composition of the invention containing the silane coupling agent (A-1) and the specified polymer (B-1), during preparation of the composition and film formation, the silane coupling agent (A-1) and hydroxyl groups in the specified polymer (B-1) react to form a crosslinked structure to develop various excellent physical properties. This effect is due to a reaction between functional groups having interactivity present in the respective compound (A) and polymer (B). Although a silane coupling group and a hydroxyl group are exemplified as an example herein, other functional groups show a similar mechanism of action.

When a reaction between a silane coupling agent (A-1) and a specified polymer (B-1) proceeds to form a crosslinked structure in a resin composition of the invention, the formation of the crosslinked structure may be confirmed by a following method.

A crosslinked film may be identified by "solid $^{13}$C-NMR".

An electronic environment of a carbon atom directly bonded to an OH group in the specified polymer (B-1) varies before and after a reaction with the silane coupling agent (A-1) and thereby the position of the peak shifts. When a peak intensity of a carbon atom directly bonded to an unreacted OH group and a peak intensity of a carbon atom of an alkoxy group formed by a reaction with the silane coupling agent (A-1) are compared between before and after crosslinking, actual reaction progress and an approximate reaction rate of the alcohol exchange reaction may be known. A degree of variation of peak position is different dependent on a structure of the specified polymer (B-1) used; accordingly, the variation is a relative index.

As the other method, a method where films before and after crosslinking are dipped in a solvent to visually observe a variation of appearance of films is exemplified. This method as well may be used to know development of crosslinking.

Specifically, a resin composition is used to form a film, the film is dipped in acetone at room temperature for 24 hr, and appearance thereof is visually observed. When a crosslinked structure is not formed or only slightly formed, the film is dissolved in acetone and deforms to an extent that does not remain appearance or the film is dissolved to be incapable of visually confirming a solid matter. On the other hand, when the crosslinked structure is formed, a film is insolubilized and the appearance of the film is kept in a state before acetone immersion.

<Solvent>

A solvent used when a resin composition of the invention is prepared is preferred to be mainly a non-protonic organic solvent from the viewpoint of rapidly progressing a reaction between a compound (A) and a polymer (B). More specifically, non-protonic organic solvent/protonic organic solvent=100/0 to 50/50 (by weight ratio) is preferred, 100/0 to 70/30 is more preferred and 100/0 to 90/10 is particularly preferred.

Preferable specific examples of the non-protonic organic solvent include acetonitrile, tetrahydrofuran, dioxane, toluene, propylene glycol monomethyl ether acetate, methyl ethyl ketone, acetone, methyl isobutyl ketone, ethyl acetate, butyl acetate, ethyl lactate, N,N-dimethylacetamide, N-methylpyrolidone, and dimethyl sulfoxide.

Preferable specific examples of protonic organic solvent include methanol, ethanol, 1-propanol, 2-propanol, 1-butanol, 1-methoxy-2-propanol, ethylene glycol, diethylene glycol and 1,3-propanediol.

<(C) Catalyst for Alcohol Exchange Reaction>

In order to accelerate a crosslinked structure formation between the compound (A) and the polymer (B), the resin composition of the invention preferably contains a catalyst (C) for alcohol exchange reaction.

As the catalyst (C) for alcohol exchange reaction, a reaction catalyst generally used in a silane coupling reaction may be used without particular restriction.

In what follows, an acid or basic catalyst (C-1) and a metal complex catalyst (C-2), which are a typical catalyst for alcohol exchange reaction, will be sequentially described.

(C-1) Acid or Basic Catalyst

As a catalyst, an acid or a basic compound is used as it is or dissolved in a solvent such as water or an organic solvent (hereinafter, referred to as an acidic catalyst and a basic catalyst, respectively). A concentration when dissolved in a solvent is not particularly restricted and may be appropriately selected in accordance with the characteristics of the acid or basic compound used, desired content of the catalyst.

The kind of the acidic catalyst or basic catalyst is not particularly restricted. Specific examples of the acidic catalyst include halogenated hydrogen such as hydrochloric acid, nitric acid, sulfuric acid, sulfurous acid, hydrogen sulfide, perchloric acid, hydrogen peroxide, carbonic acid, carboxylic acid such as formic acid and acetic acid, substituted carboxylic acid where R of a structural formula represented by RCOOH thereof is substituted with other element or a substituent, sulfonic acid such as benzene sulfonic acid, phosphoric acid, heteropoly acid, inorganic solid acid. Examples of the basic catalyst include an ammoniacal base such as ammonia water, amines such as ethylamine and aniline, alkali metal hydroxides, alkali metal alkoxides, alkaline earth oxides, quaternary ammonium salt compounds, quaternary phosphonium salt compounds.

Examples of amines as the basic catalyst usable in the invention are shown below.

As the amines, compounds from (a) to (e) shown below are exemplified.

(a) Hydrogenated nitrogen compounds such as hydrazine;

(b) aliphatic, aromatic or alicyclic primary, secondary or tertiary monoamines or polyamines such as diamine, triamine;

(c) monoamine or polyamine that is a cyclic amine containing a condensed ring and contains at least one nitrogen atom in a ring skeleton;

(d) oxygen-containing amines such as amino acids, amides, alcohol amines, ether amines, imides, lactams; and (e) hetero element-containing amines having a heteroatom such as O, S, Se.

Herein, in the case of secondary or tertiary amine, the respective substituents to nitrogen atoms (N) may be the same or different from each other. Furthermore, among the substituents, one or more may be different and the others may be same.

Specific examples of the amines include hydrazine, and as the primary amine, monomethylamine, monoethylamine, monopropylamines, monobutylamines, monopentylamines, monohexylamines, monoheptylamines, vinylamine, allylamine, butenylamines, pentenylamines, hexenylamines, pentadienylamines, hexadienylamines, cyclopentylamine, cyclohexylamine, cyclooctylamine, p-menthylamine, cyclopentenylamines, cyclohexenylamines, cyclohexadienylamines, aniline, benzylamine, naphtylamine, naphthylmethylamine, toluidine, trilenediamines, anisole, ethylenediamine, ethylenetriamine, monoethanolamine, aminothiophene, glycine, alanine, phenylalanine, aminoacetone.

Furthermore, examples include, as the secondary amine, dimethylamine, diethylamine, dipropylamines, dibutylamines, dipentylamines, dihexylamines, methylethylamine, methylpropylamines, methylbutylamines, methylpentylamines, methylhexylamines, ethylpropylamines, ethylbutylamines, ethylpentylamines, propylbutylamines, propylpentylamines, propylhexylamines, butylpentylamines, pentylhexylamines, divinylamine, diallylamine, dibutenylamines, dipentenylamines, dihexenylamines, methylvinylamine, methylallylamine, methylbutenylamines, methylpentenylamines, methylhexenylamines, ethylvinylamine, ethylallylamine, ethylbutenylamine, ethylpentenylamines, ethylhexenylamines, propylvinylamines, propylallylamines, propylbutenylamines, propylpentenylamines, propylhexenylamines, butylvinylamines, butylallylamines, butylbutenylamines, butylpentenylamines, butylhexenylamines, vinylallylamine, vinylbutenylamines, vinylpentenylamines, vinylhexenylamines, allylbutenylamines, allylpentenylamines, allylhexenylamines, butenylpentenylamines, butenylhexenylamines, dicyclopentylamine, dicyclohexylamine, methylcyclopentylamine, methylcyclohexylamine, methylcyclooctyllamine, ethylcyclopentylamine, ethylcyclohexylamine, ethylcyclooctyllamine, propylcyclopentylamines, propylcyclohexylamines, butylcyclopentylamines, butylcyclohexylamines, hexylcyclopentylamines, hexylcyclohexylamines, hexylcyclooctylamines, vinylcyclopentylamine, vinylcyclohexylamine, vinylcyclooctylamine, allylcyclopentylamine, allylcyclohexylamine, allylcyclooctylamine, butenylcyclopentylamines, butenylcyclohexylamines, butenylcyclooctylamines, dicyclopentenylamines, dicyclohexenylamines, dicyclooctenylamines, methylcyclopentenylamines, methylcyclohexenylamines, methylcyclooctenylamines, ethylcyclopentenylamines, ethylcyclohexenylamines, ethylcyclooctenylamines, propylcyclopentenylamines, propylcyclohexenylamines, butylcyclopentenylamines, butylcyclohexenylamines, vinylcyclopentenylamines, vinylcyclohexenylamines, vinylcyclooctenylamines, allylcyclopentenylamines, allylcyclohexenylamines, butenylcyclopentenylamines, butenylcyclohexenylamines, dicyclopentadienylamine, dicyclohexadienylamines, dicyclooctadienylamines, methylcyclopentadienylamine, methylcyclohexadienylamines, ethylcyclopentadienylamine, ethylcyclohexadienylamines, propylcyclopentadienylamines, propylcyclohexadienylamines, dicyclooctatrienylamines, methylcyclooctatrienylamines, ethylcyclooctatrienylamines, vinylcyclopentadienylamine, vinylcyclohexadienylamines, allylcyclopentadienylamine, allylcyclohexadienylamines, diphenylamine, ditolylamines, dibenzylamine, dinaphthylamines, N-methylaniline, N-ethylaniline, N-propylanilines, N-butylanilines, N-methyltoluidine, N-ethyltoluidine, N-propyltoluidines, N-butyltoluidines, N-methylbenzylamine, N-ethylbenzylamines, N-propylbenzylamines, N-butylbenzylamines, N-methylnaphthylamines, N-ethylnaphthylamines, N-propylnaphthylamines, N-vinylaniline, N-allylaniline, N-vinylbenzylamine, N-allylbenzylamine, N-vinyltoluidine, N-allyltoluidine, phenylcyclopentylamine, phenylcyclohexylamine, phenylcyclooctylamine, phenylcyclopentenylamine, phenylcyclohexenylamine, phenylcyclopentadienylamine, N-methylanisole, N-ethylanisole, N-vinylanisole, N-allylanisole, N-methylethylenediamine, N,N'-dimethylethylenediamine, N-ethylethylenediamine, N,N'-diethylethylenediamine, N,N'-dimethyltrilenediamines, N,N'-diethyltrilenediamines, N-methylethylenetriamine, N,N'-dimethylethylenetriamine, pyrrole, pyrrolidine, imidazole, piperidine, piperadine, methylpyrroles, methylpyrrolidines, methylimidazoles, methylpiperidines, methylpiperadines, ethylpyrroles, ethylpyrrolidines, ethylimidazoles, ethylpiperidines, ethylpiperadines, phthalimide, maleinimide, caprolactam, pyrrolidone, morpholine, N-methylglycine, N-ethylglycine, N-methylalanine, N-ethylalanine, N-methyl-aminothiophene, N-ethylaminothiophene, 2,5-piperadinedion, N-methylethanolamine, N-ethylethanolamine, purine.

Still furthermore, as the tertiary amine, examples thereof include: trimethylamine, triethylamine, tripropylamines, tributylamines, tripentylamines, trihexylamines, dimethylethylamine, dimethylpropylamines, dimethylbutylamines, dimethylpentylamines, dimethylhexylamines, diethylpropylamines, diethylbutylamines, diethylpentylamines, diethylhexylamines, dipropylbutylamines, dipropylpentylamines, dipropylhexylamines, dibutylpentylamines, dibutylhexylamines, dipentylhexylamines, methyldiethylamine, methyldipropylamines, methyldibutylamines, methyldipentylamines, methyldihexylamines, ethyldipropylamines, ethyldibutylamines, ethyldipentylamines, ethyldihexylamines, propyldibutylamines, propyldipentylamines, propyldihexylamines, butyldipentylamines, butyldihexylamines, pentyldihexylamines, methylethylpropylamines, methylethylbutylamines, methylethylhexylamines, methylpropylbutylamines, methylpropylhexylamines, ethylpropylbutylamine, ethylbutylpentylamines, ethylbutylhexylamines, propylbutylpentylamines, propylbutylhexylamines, butylpentylhexylamines, trivinylamine, triallylamine, tributenylamines, tripentenylamines, trihexenylamines, dimethylvinylamine, dimethylallylamine, dimethylbutenylamines, dimethylpentenylamines, diethylvinylamine, diethylallylamine, diethylbutenylamines, diethylpentenylamines, diethylhexenylamines, dipropylvinylamines, dipropylallylamines, dipropylbutenylamines, methyldivinylamines, methyldiallylamine, methyldibutenylamines, ethyldivinylamine, ethyldiallylamine, tricyclopentylamine, tricyclohexylamine, tricyclooctylamine, tricyclopentenylamine, tricyclohexenylamine, tricyclopentadienylamine, tricyclohexadienylamines, dimethylcyclopentylamine, diethylcyclopentylamine, dipropylcyclopentylamines, dibutylcyclopentylamines, dimethylcyclohexylamine, diethylcyclohexylamine, dipropylcyclohexylamines, dimethylcyclopentenylamines, diethylcyclopentenylamines, dipropylcyclopentenylamines, dimethylcyclohexenylamines, diethylcyclohexenylamines, dipropylcyclohexenylamines, methyldicyclopentylamine, ethyldicyclopentylamine, propyldicyclopentylamines, methyldicyclohexylamine, ethyldicyclohexylamine, propyldicyclohexylamines, methyldicyclopentenylamines, ethyldicyclopentenylamines, propyldicyclopentenylamines, N,N-dimethylaniline, N,N-dimethylbenzylamine, N,N-dimethyltoluidines, N,N-dimethylnaphthylamines, N,N-diethylaniline, N,N-diethylbenzylamine, N,N-diethyltoluidines, N,N-diethylnaphthylamines, N,N-dipropylanilines, N,N-dipropylbenzylamines, N,N-dipropyltoluidines, N,N-dipropylnaphthylamines, N,N-divinylaniline, N,N-diallylaniline, N,N-vinyltoluidines, N,N-diallylanile, diphenylmethylamine, diphenylethylamine, diphenylpropylamines, dibenzylmethylamine, dibenzylethylamine, dibenzylcyclohexylamine, dibenzylvinylamine, dibenzylallylamine, ditolylmethylamines, ditolylethylamines, ditolylcyclohexylamines, ditolylvinylamines, triphenylamine, tribenzylamine, tri(tolyl)amines, trinaphthylamines, N,N,N',N'-tetramethylethylenediamine, N,N,N',N'-tetraethylethylenediamine, N,N,N',N'-tetramethyltrilenediamines, N,N,N',N'-tetraethyltrilenediamines, N-methylpyrrole, N-methylpyrrolidine, N-methylimidazole, N,N'-dimethylpiperadine, N-methylpiperidine, N-ethylpyrrole, N-methylpyrrolidine, N-ethylimidazole, N,N'-diethylpiperadine, N-ethylpiperidine, pyridine, pyridazine, pyrazine, quinoline, quinazoline, quinuclidine, N-methylpyrrolidone, N-methylmorpholine, N-ethylpyrrolidone, N-ethylmorpholine, N,N-dimethylanisole, N,N-diethylanisole, N,N-dimethylglycine, N,N-diethylglycine, N,N-dimethylalanine, N,N-diethylalanine, N,N-dimethylethanolamine, N,N-dimethylaminothiophene, 1,1,3,3-tetramethylguanidine, 1,8-diazabicyclo[5,4,0]undec-7-ene, 1,5-diazabicyclo[4,3,0]non-5-ene, 1,4-diazabicyclo[2,2,2]octane, hexamethylenetetramine.

Accordingly, amines usable as the basic catalyst include compounds where an aliphatic or alicyclic, saturated or unsaturated hydrocarbon group; an aromatic hydrocarbon group; an oxygen and/or sulfur and/or selenium-containing hydrocarbon group are bonded to one or more nitrogen atom. A range of pKaH (acid dissociation constant of conjugate acid) of the amine is preferably 7 or more and more preferably 10 or more from the viewpoint of film strength after thermal crosslinking Among the acid or basic catalysts, from the viewpoint of rapidly progressing an alcohol exchange reaction in a film, methane sulfonic acid, p-toluene sulfonic acid, pyridinium, p-toluene sulfonate, dodecylbenzene sulfonic acid, phosphoric acid, phosphonic acid, acetic acid, 1,8-diazabicyclo[5,4,0]undec-7-ene, 1,5-diazabicyclo[4,3,0]non-5-ene and 1,1,3,3-tetramethylguanidine are preferred, and methane sulfonic acid, p-toluene sulfonic acid, phosphoric acid, 1,8-diazabicyclo[5,4,0]undec-7-ene and 1,5-diazabicyclo[4,3,0]non-5-ene are particularly preferred.

(C-2) Metal Complex Catalyst

A metal complex catalyst (C-2) used as a catalyst for alcohol exchange reaction preferably includes a metal element selected from Groups IIA, IIIB, IVA and VA of the Periodic Table and an oxo or hydroxy oxygen compound selected from β-diketone, ketoester, hydroxy carboxylic acid or ester thereof, amino alcohol and enolic active hydrogen compound.

Furthermore, among the metal elements, Group IIA elements such as Mg, Ca, St, Ba, Group IIIB elements such as Al, Ga, Group IVA elements such as Ti, Zr and Group VA elements such as V, Nb, Ta are preferred, and each thereof forms a complex excellent in the catalyst effect. Among these, complexes obtained from Zr, Al and Ti are excellent and preferred (such as ethyl orthotitanate).

Examples of oxo or hydroxy oxygen-containing compound constituting a ligand of the metal complex include, in the present invention, β-diketones such as acetylacetone, acetylacetone (2,4-pentanedione), 2,4-heptanedione; ketoesters such as methyl acetoacetate, ethyl acetoacetate, butyl acetoacetate; hydroxycarboxylic acids and esters thereof such as lactic acid, methyl lactate, salicylic acid, ethyl salicylate, phenyl salicylate, malic acid, tartaric acid, methyl tartarate; ketoalcohol compounds such as 4-hydroxy-4-methyl-2-pentanone, 4-hydroxy-2-pentanone, 4-hydroxy-4-methyl-2-pentanone, 4-hydroxy-2-heptanone; aminoalcohol compounds such as monoethanolamine, N,N-dimethylethanolamine, N-methyl-monoethanolamine, diethanolamine, triethanolamine; enolic active compounds such as methylolmelamine, methylolurea, methylolacrylamide, diethyl malonate; and compounds having substituents at the position of the methyl group, methylene group or carbonyl carbon of acetylacetone (2,4-pentanedione).

Preferable ligands are acetylacetone derivatives. In the invention, the term "acetylacetone derivatives" refer to compounds having substituents at the position of the methyl group, methylene group or carbonyl carbon of acetylacetone.

Examples of a substituent on a methyl group of acetylacetone include an alkyl group, an acyl group, a hydroxyalkyl group, a carboxyalkyl group, an alkoxy group and an alkoxyalkyl group, each of which has 1 to 3 carbon atoms and is linear or branched. Examples of a substituent on the methylene group of acetylacetone include a carboxyl group, and a carboxyalkyl group and a hydroxyalkyl group, each of which has 1 to 3 carbon atoms and is linear or branched. Examples of a substituent on the carbonyl carbon of acetylacetone include alkyl groups having 1 to 3 carbon atoms, and, in this case, the carbonyl oxygen is converted into a hydroxyl group by addition of a hydrogen atom.

Preferable specific examples of an acetylacetone derivative include acetylacetone, ethylcarbonylacetone, n-propylcarbonylacetone, i-propylcarbonylacetone, diacetylacetone, 1-acetyl-1-propionyl-acetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol. Of these compounds, acetylacetone and diacetylacetone are particularly preferred. The complex formed from the acetylacetone derivative and the metal element is a mononuclear complex in which 1 to 4 molecules of acetylacetone derivative are coordinated to one metal atom. When the coordinatable number of the metal element is greater than the sum total of coordinatable bonding hands of the acetylacetone derivative, general-purpose ligands used in ordinary complexes such as water molecule, halogen ion, nitro group, or ammonio group may be coordinated to the metal.

Examples of preferable metal complexes include tris(acetylacetonato)aluminum complex salt, di(acetylacetonato)aquoaluminum complex salt, mono(acetylacetonato)chloroaluminum complex salt, di(diacetylacetonato)aluminum complex salt, aluminum ethylacetoacetate diisopropylate, aluminum tris(ethylacetoacetate), cyclic aluminum oxide isopropylate, tris(acetylacetonato)barium complex salt, di(acetylacetonato)titanium complex salt, tris(acetylacetonato)titanium complex salt, di-1-propoxybis(acetylacetonato)titanium complex salt, zirconium tris(ethylacetoacetate), and zirconium tris(benzoate) complex salt. These complexes are excellent in stability in water-base coating liquid and gelation accelerating effect in a sol-gel reaction under heating and drying. Among them, aluminum ethylacetoacetate diisopropylate, aluminum tris(ethylacetoacetate), di(acetylacetonato)titanium complex salt, and zirconium tris(ethylacetoacetate) are preferred.

In the resin composition of the invention, catalysts (C) for alcohol exchange reaction may be used singly or in a combination of two or more kinds thereof.

Content of the catalyst (C) for alcohol exchange reaction in the resin composition is, relative to the mass of the polymer (B), preferably from 0.01 to 20% by mass and more preferably from 0.1 to 10% by mass.

In the resin composition of the invention, in addition to the compound (A) and polymer (B), which are indispensable components, and the component (C) that is a preferable additional component, various compounds may be used together depending on the purpose as long as the various compounds do not disturb an advantage of the invention.

<(B-2) Additional Binder Polymer>

In the resin composition for laser engraving of the invention, in addition to the polymer (B), a known binder polymer which is not encompassed in the polymer (B) such as a binder polymer that does not have a hydroxyl group may be used together. In what follows, such a binder polymer will be referred to as an additional binder polymer (B-2).

Together with the polymer (B-2), the additional binder polymer (B-2) may be a main component contained in the resin composition for laser engraving. General polymers that are not encompassed in the polymer (B) are appropriately selected, and one or two or more kinds thereof may be used together. In particular, when a relief forming plate precursor is used as a printing plate precursor, it is necessary to select by considering various performances such as laser engraving property, ink receiving property, engraving scraps dispersibility.

The additional binder polymer (B-2) to be used may be selected from a polystyrene resin, a polyester resin, a polyamide resin, a polyureapolyamideimide resin, a polyurethane resin, a polysulfone resin, a polyethersulfone resin, a polyimide resin, a polycarbonate resin, a hydrophilic polymer containing a hydroxyethylene unit, an acrylic resin, an acetal resin, a polycarbonate resin, rubber, a thermoplastic elastomer and the like.

For example, from the viewpoint of the laser engraving sensitivity, polymers containing a partial structure that is thermally decomposed by light exposing or heating are preferred. As such polymers, polymers described in JP-A No. 2008-163081, paragraph may be preferably exemplified. When formation of a soft and flexible film is intended, a soft resin or a thermoplastic elastomer is selected. These are detailed in paragraphs [0039] to [0040] of JP-A No. 2008-163081. Furthermore, from the viewpoint of easy preparation of a relief forming layer composition and an improvement in resistance to oil-based ink in the resulting relief printing plate, a hydrophilic or alcoholphilic polymer may be preferably used. The hydrophilic polymer detailed in paragraph [0041] of JP-A No. 2008-163081 may be used.

Furthermore, polyester including a hydroxy carboxylic acid unit such as polylactic acid may be preferably used. Such polyester is preferably selected specifically from a group consisting of polyhydroxyalkanoate (PHA), a lactic acid-based polymer, polyglycolic acid (PGA), polycaprolactone (PCL), poly(butylene succinate), and derivatives and mixtures thereof.

When a polymer is heated or light exposed to cure with a purpose of improving the strength, a polymer having a carbon-carbon unsaturated bond in a molecule is preferably used.

Of such polymers, examples of a polymer containing a carbon-carbon unsaturated bond in a main chain include, for example, SB (polystyrene-polybutadiene), SBS (polystyrene-polybutadiene-polystyrene), SIS (polystyrene-polyisoprene-polystyrene), SEBS (polystyrene-polyethylene/polybutylene-polystyrene).

A polymer having a carbon-carbon unsaturated bond in a side chain may be obtained by introducing a group having a carbon-carbon unsaturated bond such as an allyl group, an acryloyl group, a methacryloyl group, a styryl group, or a vinyl ether group in a side chain of the above mentioned binder polymer usable in the invention. As a method for introducing a carbon-carbon unsaturated bond in a side chain of a binder polymer, a known method such as a method where a structural unit having a polymerizable group precursor obtained by bonding a protective group to a polymerizable group is copolymerized in a polymer, and the protective group is eliminated to form a polymerizable group, and a method where a polymer compound having plural reactive groups such as a hydroxyl group, an amino group, an epoxy group, or a carboxyl group is prepared, and a compound having a group reacting with the reactive group and a carbon-carbon unsaturated bond is introduced thereto by polymer reaction may be used. According to these methods, introduction amounts of unsaturated bonds and polymerizable groups in a polymer compound may be controlled.

Thus, by considering physical properties in accordance with applications of a relief printing plate and selecting a binder polymer corresponding to the object, the binder polymers may be used singly or in a combination of two or more kinds thereof.

A weight average molecular weight (based on GPC measurement with polystyrene) of the binder polymer in the invention is preferably from 5000 to 500000. When the weight average molecular weight is 5000 or more, a shape maintaining property of the binder polymer is excellent. On the other hand, when the weight average molecular weight is 500000 or less, the binder polymer is readily dissolved in a solvent such as water and convenient for preparing a relief forming layer. The weight average molecular weight of the binder polymer is more preferably from 10000 to 400000 and particularly preferably from 15000 to 300000.

Total content of the binder polymer [sum total of content of the polymer (B) and content of the additional binder polymer (B-2)] is, relative to a total mass of solid contents of the resin composition for laser engraving, preferably from 5% by mass to 95% by mass, preferably from 15% by mass to 80% by mass, and more preferably from 20% by mass to 65% by mass.

For example, in the case where the resin composition for laser engraving of the invention is applied to form a relief forming layer of a relief printing plate precursor, by setting the content of binder polymer at 5% by mass or more, printing durability enough to use the resulting relief printing plate as a printing plate is obtained, and by setting the content of the binder polymer at 80% by mass or less, without being deficient in the other components, even when the relief printing plate is used as a flexo printing plate, flexibility enough to use it as a printing plate may be obtained.

[Relief Printing Plate Precursor for Laser Engraving]

A relief printing plate precursor for laser engraving of the invention includes on a support a relief forming layer made from the resin composition for laser engraving of the invention.

In what follows, a preferable embodiment when a resin composition of the invention is applied to a relief forming layer will be described.

A relief forming layer according to the invention is preferably made from a resin composition (a resin composition of the invention) containing, together with the compound (A) and the polymer (B), which are described above as indispensable components, and a catalyst for alcohol exchange reaction (C) and an additional binder polymer (B-2), which are used together as required, an optional component such as a polymerizable compound, a photothermal converter, a polymerization initiator, a plasticizer, or the like. In what follows, the respective components will be detailed.

<(D) Polymerizable Compound>

In the invention, from the viewpoint of forming a crosslinked structure in a relief forming layer, a relief forming layer coating liquid (a resin composition of the invention) preferably contains a polymerizable compound for forming the crosslinked structure.

A polymerizable compound usable herein may be selected from compounds having at least one, preferably 2 or more, more preferably 2 to 6 ethylenically unsaturated double bonds.

In what follows, a monofunctional monomer that has one ethylenically unsaturated double bond in a molecule and a polyfunctional monomer having 2 or more ethylenically unsaturated double bonds in a molecule, which are used as a polymerizable compound, will be described.

In the relief forming layer according to the invention, a polyfunctional monomer is preferably used because a film should have a crosslinked structure therein. A molecular weight of the polyfunctional monomer is preferably from 200 to 2,000.

Examples of monofunctional monomer include esters of an unsaturated carboxylic acid (for example, acrylic acid, methacrylic acid, itaconic acid, crotonic acid, isocrotonic acid, maleic acid) and a monohydric alcohol compound, and amides of an unsaturated carboxylic acid and a monoamine compound. Examples of polyfunctional monomer include esters of an unsaturated carboxylic acid (for example, acrylic acid, methacrylic acid, itaconic acid, crotonic acid, isocrotonic acid, maleic acid) and a polyhydric alcohol compound, and amides of an unsaturated carboxylic acid and a polyamine compound.

Preferable examples also include addition reaction products of an unsaturated carboxylic acid ester or amide having a nucleophilic substituent group such as a hydroxyl group, an amino group or a mercapto group with a monofunctional or polyfunctional isocyanate or epoxy compound, and dehydration condensation products thereof with a monofunctional or polyfunctional carboxylic acid.

Preferable examples further include addition reaction products of an unsaturated carboxylic acid ester or amide having an electrophilic substituent group such as an isocyanate group or an epoxy group with a monofunctional or polyfunctional alcohol, amine or thiol, and substitution reaction products of an unsaturated carboxylic acid ester or amide having an elimination substitution group such as a halogen group or a tosyloxy group with a monofunctional or polyfunctional alcohol, amine or thiol.

Other examples include the above compounds in which an unsaturated phosphonic acid, styrene, vinyl ether, or the like is used in place of the unsaturated carboxylic acid.

The polymerizable compound is not specifically limited, and other than the above described compounds, various known compounds may be used, examples of which include compounds described in paragraphs [0098] to [0124] in JP-A No. 2009-204962.

In the invention, as a polymerizable compound, a compound having a sulfur atom in a molecule is preferred from the viewpoint of an improvement in the engraving sensitivity.

As a polymerizable compound having a sulfur atom in a molecule, from the viewpoint of improving the engraving sensitivity, a polymerizable compound having at least two ethylenically unsaturated bonds and a carbon-sulfur bond at the site linking the two ethylenically unsaturated bonds (hereinafter, appropriately referred to as "sulfur-containing polyfunctional monomer") is preferably used.

As the functional group containing a carbon-sulfur bond in the sulfur-containing polyfunctional monomer in the invention, a functional group containing sulfide, disulfide, sulfoxide, sulfonyl, sulfonamide, thiocarbonyl, thiocarboxylic acid, dithiocarboxylic acid, sulfamic acid, thioamide, thiocarbamate, dithiocarbamate or thiourea is exemplified.

As a linking group containing a carbon-sulfur bond linking two ethylenically unsaturated bonds in the sulfur-containing polyfunctional monomer, a linking group containing at least one unit selected from —C—S—, —C—SS—, —NH(C=S)O—, —NH(C=O)S—, —NH(C=S)S—, and —C—SO$_2$— is preferred.

The number of sulfur atoms contained in a molecule of the sulfur-containing polyfunctional monomer is not particularly restricted as long as one or more sulfur atoms are contained and may be appropriately selected according to the object. However, the number of sulfur atoms is preferably from 1 to 10, more preferably from 1 to 5 and particularly preferably from 1 to 2 from the viewpoint of keeping balance between the engraving sensitivity and solubility in the coating solvent.

On the other hand, the number of the ethylenically unsaturated sites contained in a molecule is not particularly restricted as long as it is two or more and may be appropriately selected in accordance with the object. However, the number of ethylenically unsaturated sites is preferably from 2 to 10, more preferably from 2 to 6 and still more preferably from 2 to 4 from the viewpoint of the flexibility of a crosslinked film.

A molecular weight of the sulfur-containing polyfunctional monomer in the invention is preferably from 120 to 3000 and more preferably from 120 to 1500 from the viewpoint of the flexibility of a formed film.

The sulfur-containing polyfunctional monomers in the invention may be used singly or as a mixture with a polyfunctional or monofunctional polymerizable compound that does not have a sulfur atom in a molecule.

Specific examples of polymerizable compounds containing a surfer atom in the molecular include compounds described in paragraphs [0032] to [0037] in JP-A No. 2009-255510, and these compounds may be used in the present invention.

From the viewpoint of the engraving sensitivity, an embodiment where the sulfur-containing polyfunctional monomers are used singly or as a mixture of a sulfur-containing polyfunctional monomer and a monofunctional ethylenic monomer is preferred and an embodiment where a mixture of a sulfur-containing polyfunctional monomer and a monofunctional ethylenic monomer is used is more preferred.

When polymerizable compounds such as a sulfur-containing polyfunctional monomer are used in a relief forming layer according to the invention, film physical properties such as brittleness and flexibility may be controlled.

Total content of a polymerizable compound (D) such as a sulfur-containing polyfunctional monomer in the relief forming layer is, relative to a non-volatile component, preferably from 10% by mass to 60% by mass and more preferably from 15% by mass to 45% by mass from the viewpoint of the flexibility and brittleness of a crosslinked film.

When the sulfur-containing polyfunctional monomer and other polymerizable compound are used together, an amount of the sulfur-containing polyfunctional monomer in the entire polymerizable compound is preferably 5% by mass or more and more preferably 10% by mass or more.

<(E) Polymerization Initiator>

When the resin composition for laser engraving of the invention is used to prepare a relief forming layer, it is preferred to further contain a polymerization initiator (E).

As the polymerization initiator, polymerization initiators well known among skilled persons may be used without particular restriction. In what follows, a radical polymerization initiator that is a preferable polymerization initiator will be detailed. However, the invention is not restricted to description thereof.

Examples of preferable radical polymerization initiator in the invention include (a) aromatic ketones, (b) onium salt compounds, (c) organic peroxides, (d) thio compounds, (e) hexaarylbiimidazole compounds, (f) ketoxime ester compounds, (g) borate compounds, (h) azinium compounds, (i) metallocene compounds, (j) active ester compounds, (k) carbon-halogen bond-containing compounds, (l) azo compounds. In what follows, specific examples of the (a) to (1) are exemplified without restricting the invention thereto.

In the invention, (c) organic peroxides and (1) azo compounds are more preferred and (c) organic peroxides are particularly preferred from the viewpoint of the engraving sensitivity and an excellent relief edge shape when the radical polymerization initiator is applied to form a relief forming layer of a relief printing plate precursor.

As the (a) aromatic ketones, (b) onium salt compounds, (d) thio compounds, (e) hexaarylbiimidazole compounds, (f) ketoxime ester compounds, (g) borate compounds, (h) azinium compounds, (i) metallocene compounds, (j) active ester compounds, and (k) carbon-halogen bond-containing compounds, compounds exemplified in paragraphs [0074] to in JP-A No. 2008-63554 may be preferably used.

Furthermore, as the (c) organic peroxides and (1) azo compounds, compounds shown below are preferred.

(c) Organic Peroxides

Examples of the (c) organic peroxide preferable as the radical polymerization initiator usable in the invention include peroxy esters such as 3,3',4,4'-tetra-(tertiarybutylperoxycarbonyl)benzophenone, 3,3',4,4'-tetra-(tertiaryamylperoxycarbonyl)benzophenone, 3,3',4,4'-tetra-(tertiaryhexylperoxycarbonyl)benzophenone, 3,3',4,4'-tetra-(tertiaryoctylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, ditertiary-butyldiperoxyisophthalate.

(1) Azo Compound

Examples of (1) azo compounds preferable as the radical polymerization initiator usable in the invention include 2,2'-azobisisobutylonitrile, 2,2'-azobispropionitrile, 1,1'-azobis(cyclohexane-1-carbonitrile), 2,2'-azobis(2-methylbutylonitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamideoxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide], 2,2'-azobis(2,4,4-trimethylpentane).

In the invention, it has been found that the (c) organic peroxides are preferred as a polymerization initiator in the invention from the viewpoint of crosslinking property of a film (relief forming layer) and furthermore, as an unexpected effect, from the viewpoint of improving the engraving sensitivity.

From the viewpoint of the engraving sensitivity, an embodiment where the organic peroxide (c), and a polymer having a glass transition temperature of ordinary temperature or more as the polymer (B) or the additional binder polymer (B-2) are combined is particularly preferred.

This is considered to be because when a relief forming layer is cured by thermal crosslinking with organic peroxide, an unreacted organic peroxide that does not take part in radical generation remains, and the remaining organic peroxide works as a self-reactive additive and is decomposed exothermically during laser engraving; as a result, the exothermic heat is added to irradiated laser energy and thereby engraving sensitivity is heightened.

It is considered that in particular when the glass transition temperature of the polymer (B) is room temperature or more, heat generated by decomposition of the organic peroxide is efficiently transmitted in the binder polymer and effectively utilized to pyrolyze the polymer (B) and additional binder polymer (B-2), and thereby higher engraving sensitivity is obtained.

Although this fact will be detailed later when a photothermal converter is described, the above effect is remarkable when carbon black is used as the photothermal converter. This is considered to be because heat generated from carbon black is transmitted also to the organic peroxide (c), and thereby heat is generated not only from the carbon black but also from the organic peroxide; accordingly heat energy to be used to decompose the polymer (B) and the like is synergetically generated.

The polymerization initiators (E) in the invention may be used singly or in a combination of two or more kinds thereof.

Content of the polymerization initiator (E) in a relief forming layer is, relative to a total mass of solid content in the relief forming layer, preferably from 0.01 to 10% by mass and more preferably from 0.1 to 3% by mass. When the content of the polymerization initiator is set at 0.01% by mass or more, an addition effect thereof is obtained and a crosslinkable relief forming layer is rapidly crosslinked. Furthermore, when the content of the polymerization initiator is set at 10% by mass or less, other components are not deficient and the printing durability enough for use as a relief printing plate is obtained.

<(F) Photothermal Converter>

The relief forming layer according to the invention preferably further contains a photothermal converter. That is, a photothermal converter in the invention is considered to accelerate pyrolysis of a cured matter during laser engraving by absorbing light of laser and generating heat. Accordingly, a photothermal converter that absorbs light having a laser wavelength used in engraving is preferably selected.

When a relief forming layer for laser engraving according to the invention is used in laser engraving with a laser (such as a YAG laser, a semiconductor laser, a fiber laser, a surface-emitting laser) emitting infrared ray of from 700 to 1300 nm as a light source, as the photothermal converter, compounds having the maximum absorption wavelength of from 700 to 1300 nm are preferred.

As the photothermal converter in the invention, various dyes or pigments may be used.

As the dyes of the photothermal converters, commercially available dyes and known dyes that are described in documents such as "Handbook of Dyes" (edited by the Society of Synthetic Organic Chemistry, Japan, 1970), may be used. Specific examples thereof include dyes that have the maximum absorption wavelength of from 700 nm to 1300 nm such as azo dyes, metal complex azo dyes, pyrazolone azo dyes, naphthoquinone dyes, anthraquinone dyes, phthalocyanine dyes, carbonium dyes, diimmonium compounds, quinonimine dyes, methine dyes, cyanine dyes, squarylium dyes, pyrylium salts, metal thiolate complexes.

Examples of dyes preferably used in the invention include cyanine dyes such as a heptamethine cyanine dye, oxonol dyes such as a pentamethine oxonol dye, phthalocyanine dyes and dyes described in paragraphs [0124] to [0137] of JP-A No. 2008-63554.

As the pigments of the photothermal converters used in the invention, commercially available pigments and pigments that are described in "Color Index (C. I.) Binran (Color Index Handbook)", "Saishin Ganryo Binran" (edited by Nihon Ganryo Gijyutu Kyokai, 1977), "Saishin Ganryo Oyo Gijyutu" (published by CMC Publishing Co., 1986) and "Insatu Inki Gijyutu" (published by CMC Publishing Co., 1984) may be exemplified.

Examples of kinds of pigment include black pigments, yellow pigments, orange pigments, brown pigments, red pigments, violet pigments, blue pigments, green pigments, fluorescent pigments, metal powder pigments and, other than these, polymer-bonded pigments. Specific examples thereof include insoluble azo pigments, azo lake pigments, condensed azo pigments, chelate azo pigments, phthalocyanine pigments, anthraquinone pigments, perylene and perynone pigments, thioindigo pigments, quinacridone pigments, dioxazine pigments, isoindolinone pigments, quinophthalone pigments, dyeing lake pigments, azine pigments, nitroso pigments, nitro pigments, natural pigments, fluorescent pigments, inorganic pigments, carbon black. Among these pigments, carbon black is preferred.

Any of carbon blacks may be used irrespective of classification by ASTM and applications (such as carbon black for color, rubber, dry battery) as long as it is stable in the dispersibility in the composition. Examples of the carbon black include, for example, furnace black, thermal black, channel black, lamp black, acetylene black. The black colorant such as carbon black may be used as a color chip or color paste by dispersing it in advance in nitrocellulose or a binder optionally together with a dispersing agent for easy dispersion. Chips or paste like this may be readily commercially availed.

In the invention, carbon black having relatively small specific surface area and relatively low DBP absorption and fine carbon black having a large specific surface area may be used. Examples of preferable carbon black include PRINTEX (registered trade mark) U, PRINTEX (registered trade mark) A or SPEZIAL SCHWARZ (registered trade mark) 4 (manufactured by Degussa).

The carbon black applicable to the invention is preferably conductive carbon black having a specific surface area of at least 150 $m^2/g$ and a DBP number of at least 150 ml/100 g, from the viewpoint of improving engraving sensitivity by efficiently transmitting heat generated owing to photothermal conversion to a surrounding polymer.

The specific surface area is preferably at least 250 $m^2/g$, and particularly preferably at least 500 $m^2/g$. The DBP number is preferably at least 200 ml/100 g and particularly preferably at least 250 ml/100 g. The carbon black may be either acidic carbon black or basic carbon black. The carbon black is preferably basic carbon black. A mixture of different carbon blacks may be naturally used.

An appropriate conductive carbon black having the specific surface area ranging up to about 1500 $m^2/g$ and the DBP number ranging up to about 550 ml/100 g may be commercially availed under the name of, for example, KETJEN BLACK (registered trade name) EC300J and KETJEN BLACK (registered trade name) EC600J (manufactured by Akzo), PRINTEX (registered trade mark) XE (manufactured by Degussa) or BLACK PEARLS (registered trade mark) 2000 (manufactured by Cabot), KETJENBLACK (trade name, manufactured by Lion Corporation).

When the carbon black is used as a photothermal converter, thermal crosslinking is preferred rather than photocrosslinking that makes use of UV-rays from the viewpoint of curability of a film, and when the organic peroxide (c) that is the polymerization initiator (E) that is the preferable additional component is used with the carbon black, the engraving sensitivity is remarkably high.

As the most preferable embodiment of the invention, as mentioned above, an embodiment where the polymer (B) and the additional binder (B-2), having a glass transition temperature of 20° C. or more, are used, and the organic peroxide (c) that is the polymerization initiator (E) and the carbon black that is the photothermal converter (F) are combined and used is exemplified.

Content of the photothermal converter in the resin composition for laser engraving varies depending on a magnitude of a molecular absorption coefficient intrinsic to the molecule. However, the content of the photothermal converter is, relative to a total mass of solid contents in the resin composition, preferably in the range of 0.01% by mass to 20% by mass, more preferably in the range of 0.05% by mass to 10% by mass and particularly preferably in the range of 0.1% by mass to 5% by mass.

<Other Additives>

The resin composition for laser engraving of the invention preferably contains a plasticizer. The plasticizer has an action of softening a film formed from the resin composition for laser engraving and is necessary to be well compatible with the binder polymer.

Examples of preferable plasticizer include, for example, dioctyl phthalate, didodecyl phthalate, polyethylene glycols, polypropylene glycols (monool and diol), and polypropylene glycols (monool and diol).

To the resin composition for laser engraving of the invention, nitrocellulose or a material having high thermal conductivity is preferably added as an additive for improving the engraving sensitivity. The nitrocellulose is a self-reactive compound; accordingly, the nitrocellulose itself generates heat during laser engraving and assists pyrolysis of a binder polymer such as a co-existing hydrophilic polymer. As a result, the engraving sensitivity is considered to be improved. The material having high thermal conductivity is added to help thermal transmission and examples thereof include inorganic compounds such as metal particles and organic compounds such as conductive polymers. Examples of the metal particles include gold microparticles, silver microparticles and copper microparticles, which have particle diameters from micrometer order to several nanometer order. A preferable conductive polymer includes particularly preferably conjugate polymers, specifically, polyaniline and polythiophene being exemplified.

Furthermore, when a co-sensitizer is used, the sensitivity when the resin composition for laser engraving is photocured may be further improved.

In order to inhibit a polymerizable compound from unnecessarily thermally polymerizing during production or storage of the resin composition, a small amount of thermal polymerization inhibitor is desirably added thereto.

A colorant such as a dye or a pigment may be added to color the resin composition for laser engraving. Thereby, properties such as visibility of an image portion and image densitometer suitability may be improved.

Furthermore, a known additive such as filler may be added to improve physical properties of a cured film of the resin composition for laser engraving.

A relief printing plate precursor for laser engraving of the invention has a relief forming layer made from the resin composition for laser engraving containing the components such as mentioned above. The relief forming layer is preferably formed on a support.

The relief printing plate precursor for laser engraving, as required, may further have an adhesive layer between the support and the relief forming layer, and a slip coat layer and a protective film on the relief forming layer.

<Relief Forming Layer>

The relief forming layer is a layer made from the resin composition for laser engraving according to the above-mentioned invention. When a crosslinkable resin composition is used as the resin composition for laser engraving, a crosslinkable relief forming layer is obtained. The relief printing plate precursor for laser engraving of the invention preferably has a relief forming layer to which a crosslinkable function is further imparted by containing a polymerizable compound (D) and a polymerization initiator (E) in addition to a crosslinked structure owing to the compound (A) and the polymer (B).

As an embodiment of preparing a relief printing plate from a relief printing plate precursor for laser engraving, an embodiment where a relief printing plate precursor having a cured relief forming layer is prepared by crosslinking a relief forming layer, and, thereafter, the cured relief forming layer (hard relief forming layer) is laser engraved to form a relief layer to prepare a relief printing plate is preferred. When the relief forming layer is crosslinked, the relief layer may be inhibited from wearing during printing and, after laser engraving, a relief printing plate having a relief layer having a sharp shape may be obtained.

The relief forming layer may be formed by molding a resin composition for laser engraving having components for a relief forming layer as mentioned above into a sheet or a sleeve. The relief forming layer is usually formed on a support as described below. However, the relief forming layer may be directly formed on a surface of a member such as a cylinder provided in an apparatus for plate making or printing, or may be disposed and solidified there, that is, a support is not necessarily required.

In what follows, an example where a relief forming layer is formed into a sheet will be mainly described.

<Support>

A support usable in a relief printing plate precursor for laser engraving will be described.

A material of a support used in a relief printing plate precursor for laser engraving is not particularly restricted. However, a material high in the dimensional stability is preferably used. Examples thereof include, for example, a metal such as steel, stainless, aluminum, a plastic resin such as polyester (such as PET, PBT, or PAN), polyvinyl chloride, a synthetic rubber such as styrene-butadiene rubber and a glass fiber-reinforced plastic resin (such as an epoxy resin, a phenol resin). A PET (polyethylene terephthalate) film or a steel substrate is preferably used as a support. A shape of the support is determined depending on whether the relief forming layer is formed into a sheet or a sleeve. A preferable support when the relief forming layer is formed into a sleeve will be detailed below.

<Adhesive Layer>

When a relief forming layer is formed on a support, an adhesive layer may be disposed therebetween to strengthen adhesiveness between the layers.

A material usable in the adhesive layer has a strong adhesiveness after (and preferably also before) the relief forming layer is crosslinked. Herein, the adhesiveness means both of the adhesiveness between support/adhesive layer and the adhesiveness between adhesive layer/relief forming layer.

As to the adhesiveness between support/adhesive layer, when an adhesive layer and a relief forming layer are peeled off from a layered body of support/adhesive layer/relief forming layer at a speed of 400 mm/min, preferably peeling power is 1.0 N/cm or more per 1 cm width of a sample or the layers cannot be peeled off, and more preferably peeling power is 3.0 N/cm or more or the layers cannot be peeled off.

As to the adhesiveness between adhesive layer/relief forming layer, when an adhesive layer is peeled off from adhesive layer/relief forming layer at a speed of 400 mm/min, preferably peeling power is 1.0 N/cm or more per 1 cm width of a sample or the adhesive layer cannot be peeled off, and more preferably peeling power is 3.0 N/cm or more or the adhesive layer cannot be peeled off.

As a material (adhesive agent) usable in an adhesive layer, for example, materials described in I. Skeist, ed., "Handbook of Adhesives" 2nd Edition (1977) may be used.

<Protective Film, Slip Coat Layer>

The relief forming layer becomes an area (relief layer) where a relief is formed by laser engraving and the relief layer surface works as an inking area. A crosslinked relief forming layer is strengthened by crosslinking; accordingly, scratches or dents that affects adversely on printing are hardly formed on a surface of the relief forming layer. However, the relief forming layer prior to crosslinking is frequently deficient in the strength; accordingly, scratches or dents tend to be generated on a surface thereof. From such viewpoint, a protective film may be disposed on a surface of a relief forming layer to inhibit scratches or dents from forming on the surface of a relief forming layer.

When a protective film is too thin, scratches or dents may not be effectively inhibited. On the other hand, when the protective film is too thick, handling becomes inconvenient and cost becomes higher. Accordingly, a thickness of the protective film is preferably from 25 μm to 500 μm and more preferably from 50 μm to 200 μm.

As the protective film, a material known as a protective film of a printing plate may be used. Examples of the material include, for example, a polyester film such as a PET (polyethylene terephthalate) film and a polyolefin film such as a PE (polyethylene) film or PP (polypropylene) film. A film surface may be plain or matted.

When a protective film is formed on the relief forming layer, the protective film should be peelable.

When a protective film is impossible to peel or inversely difficult to adhere to the relief forming layer, a slip coat layer may be disposed between both layers.

A material that is used in the slip coat layer is preferably made mainly of a resin soluble or dispersible in water and less in tackiness such as polyvinyl alcohol, polyvinyl acetate, partially saponified polyvinyl alcohol, hydroxyalkyl cellulose, alkyl cellulose, a polyamide resin. Among these, partially saponified polyvinyl alcohol having a degree of saponification from 60 to 99 mole %, hydroxyalkyl cellulose of which alkyl group has 1 to 5 carbon atoms and alkyl cellulose are particularly preferably used from the viewpoint of the tackiness.

When the protective film is peeled off from relief forming layer (and slip coat layer)/protective film at a speed of 200 mm/min, the peeling power per 1 cm is preferably from 5 to 200 mN/cm and more preferably from 10 to 150 mN/cm. When the peeling power is 5 mN/cm or more, an operation may be done without causing peeling of the protective film during the operation and, when the peeling power is 200 mN/cm or less, the protective film may be peeled off without difficulty.

—Method for Preparing Relief Printing Plate Precursor for Laser Engraving—

In the next place, a method for preparing a relief printing plate precursor for laser engraving will be described.

A method for forming a relief forming layer in a relief printing plate precursor for laser engraving is not particularly restricted. For example, a method where a coating liquid composition for relief forming layer (resin composition for laser engraving) is prepared, followed by, after a solvent is removed from the coating liquid composition for relief forming layer, melt-extruding on a support surface or a plate cylinder is exemplified. Alternatively, when a relief forming layer is formed on a support, a method where a coating liquid composition for relief forming layer is cast on a support and dried in an oven to remove a solvent from the coating liquid composition may be used.

Thereafter, as required, a protective film may be laminated on a relief forming layer. Lamination may be performed by pressure bonding a protective film and a relief forming layer with a heated calender roll or by adhering a protective film to a relief forming layer on a surface of which a small amount of solvent is impregnated.

When a protective film is used, a method where, in the beginning, a relief forming layer is laminated on a protective film, then, followed by laminating a support may be adopted.

When an adhesive layer is disposed, a support on which an adhesive layer is coated may be used. When a slip coat layer is disposed, a protective film on which a slip coat layer is coated may be used.

The coating liquid composition for forming a relief forming layer may be produced in such a manner that, for example, a polymer (B) and, as optional components, a photothermal converter and a plasticizer are dissolved in an appropriate solvent, followed by dissolving a polymerization initiator and a polymerizable compound therein, further followed by finally adding a compound (A) such as a silane coupling agent thereto.

As a solvent, a solvent made mainly of the non-protonic solvent mentioned above is preferably used and since almost all of the solvent component is necessary to be removed in a step of producing a printing plate precursor, a total addition amount of the solvent is preferably suppressed as small as possible. When a system is set under high temperatures, an addition amount of the solvent may be suppressed. However, when a temperature is too high, a polymerizable compound tends to readily polymerize; accordingly, a preparation temperature of a coating liquid composition after addition of a polymerizable compound and/or a polymerization initiator is preferably from 30° C. to 80° C.

A thickness of a relief forming layer in a relief printing plate precursor for laser engraving is, before and after crosslinking, preferably 0.05 mm or more but 10 mm or less, more preferably 0.05 mm or more but 7 mm or less and particularly preferably 0.05 mm or more but 3 mm or less.

In the next place, a case where a relief forming layer is formed into a sleeve will be described. Even in the case where the relief forming layer is formed into a sleeve, a known resin molding method may be used. For example, a cast molding method, or a method where a resin is extruded from a nozzle or a dice by use of a machine such as a pump or an extruder, and a thickness thereof is controlled with a blade or by calendaring with a roll may be exemplified. At this time, the resin composition constituting the relief forming layer may be molded while heating the resin composition to an extent that does not damage the characteristics thereof. Furthermore, as required, rolling and polishing may be applied.

In the case where the relief forming layer is formed into a sleeve, a relief forming layer itself may be formed into a cylinder from the beginning, or, after the relief forming layer is molded into a sheet at first, it may be formed into a cylinder by fixing it on a cylindrical support or a plate cylinder. A method for fixing the relief forming layer on a cylindrical support is not particularly restricted. For example, a method of fixing with an adhesive tape having on both sides thereof an adhesive layer or a sticky layer or a method of fixing via an adhesive layer may be applied.

[Relief Printing Plate and Production Thereof]

A method for producing a relief printing plate from a relief printing plate precursor of the invention preferably includes (1) a step of crosslinking a relief forming layer in a relief printing plate precursor for laser engraving of the invention by irradiating an active ray and/or by heating and (2) a step of forming a relief layer by laser engraving the crosslinked relief forming layer. With the relief printing plate precursor of the invention, according to such a producing method as mentioned above, a relief printing plate having a relief layer may be produced. When the relief printing plate precursor of the invention has a support, such a relief layer is formed on a support surface and this is applied to a printing machine to print.

A preferable method for producing a relief printing plate in the invention may further include after the step (2), as required, step (3) to step (5) described below.

Step (3): a step of rinsing an engraved relief layer surface with water or a liquid made mainly of water (rinse step).

Step (4): a step of drying the engraved relief layer (drying step).

Step (5): a step of imparting energy to the engraved relief layer to further crosslink the relief layer (post-crosslinking step).

In the step (1), the relief forming layer is crosslinked by irradiating an active light and/or by heating.

When a step of crosslinking with light and a step of crosslinking with heat are used together in the step (1) of crosslinking a relief forming layer, these steps may be applied either simultaneously or separately.

The step (1) is a step where the relief forming layer of the relief printing plate precursor for laser engraving is crosslinked with light and/or heat.

The relief forming layer includes a compound (A) and a polymer (B), and preferably further includes an additional binder polymer (B-2), a photothermal converter, a polymerization initiator and a polymerizable compound, and the step (1) is a step where the polymerizable compound is polymerized under an action of the polymerization initiator to form crosslinking at a higher density in addition to a crosslinked structure of the compound (A) and the polymer (B) to make the relief forming layer a cured relief forming layer.

The polymerization initiator is preferably a radical generator, and the radical generator is classified into a photopolymerization initiator and a thermal polymerization initiator depending on whether a trigger for generating radicals is light or heat.

When a relief forming layer contains a photopolymerization initiator, by irradiating an active light that becomes a trigger for the photopolymerization initiator, the relief forming layer may be crosslinked (step of crosslinking with light).

The active light is generally irradiated over an entire surface of the relief forming layer. Visible light, UV light or an electron beam is exemplified as the active light, UV light being most generally used. When a base material side for fixing a relief forming layer such as a support of the relief forming layer is taken as a back surface, the active light may be irradiated only on a front side. However, when the support used is a transparent film that transmits an active light, the active light may be preferably irradiated additionally from a back side. When the active light is irradiated from a front side of the relief forming layer with a protective film, the active light may be irradiated as it is or after peeling off the protective film. When oxygen is present, inhibition of polymerization may be caused; accordingly, the active light may be irradiated after a crosslinkable relief forming layer is covered with a vinyl chloride film and evacuated.

When a relief forming layer contains a thermal polymerization initiator (the photopolymerization initiator may serve as a thermal polymerization initiator), a relief forming layer may be crosslinked by heating a relief printing plate precursor for laser engraving (step of crosslinking with heat). As a heating method, a method of heating a printing plate precursor in a hot air oven or a far-infrared oven for a predetermined period of time and a method of bringing into contact with a heated roll for a predetermined period of time may be exemplified.

When the step (1) is a step of crosslinking with light, although an apparatus for irradiating an active light is relatively expensive, a printing plate precursor is not heated to high temperatures; accordingly, there is no particular restriction on a raw material of the printing plate precursor.

When the step (1) is a step of crosslinking with heat, although advantageous in that a particularly expensive apparatus is not necessary, the printing plate precursor is heated to high temperatures; accordingly, a raw material used has to be cautiously selected because thermoplastic polymers soft at high temperatures are likely to be deformed during heating.

In the case of thermal crosslinking, a thermal polymerization initiator may be added. As the thermal polymerization initiator, commercially available thermal polymerization initiators for free radical polymerization may be used. Examples of such a thermal polymerization initiator include, for example, appropriate peroxides, and compounds containing a hydroperoxide or azo group. A typical vulcanizing agent may also be used for crosslinking. When a heat-curable resin such as an epoxy resin is added to a layer as a crosslinking component, thermal crosslinking may be performed.

As a method for crosslinking a relief forming layer in the step (1), a method of crosslinking with heat is preferred from the viewpoint that a relief forming layer is uniformly cured (crosslinked) from a surface of the relief forming layer to the inside thereof.

When the relief forming layer is crosslinked, there are advantages in that, firstly, a relief formed after laser engraving is made sharp and, secondly, the tackiness of engraving scraps generated during the laser engraving is suppressed. When an uncrosslinked relief forming layer is laser engraved, owing to heat transmitted to the vicinity of a laser-irradiated portion, a portion that is not intended tends to melt and deform, so that a sharp relief layer may not be obtained in some cases. Furthermore, as a general property of materials, as a molecular weight becomes smaller, the material tends to be liquid rather than solid, that is, the tackiness tends to be stronger. Engraving scraps generated when a relief forming layer is engraved tend to be stronger in the tackiness when a larger amount of a low molecular weight material is used. A low molecular weight polymerizable compound is polymerized to form a polymer; accordingly, generated engraving scraps tend to be less in the tackiness.

The step (2) is a step of laser engraving a crosslinked relief forming layer to form a relief layer. In the step (2), it is preferred that, with a specified laser described below, laser light corresponding to an image desired to form is irradiated to form a relief to form a relief layer for printing.

Specifically, a relief layer is formed by engraving by irradiating laser light corresponding to an image desired to form to the crosslinked relief forming layer. A step of controlling a laser head by a computer based on digital data of an image desired to form to scan and irradiate on a relief forming layer is exemplified. When an infrared laser is irradiated, molecules in the relief forming layer are caused to vibrate to generate heat. When a high-output infrared laser such as a carbon dioxide laser or a YAG laser is used, a lot of heat is generated in a laser-irradiated portion, thereby molecules in a photosensitive layer undergo molecular cutting or ionization to be selectively removed, namely, engraved. At this time, a light exposed region generates heat also by a photothermal converter in the relief forming layer; accordingly, heat generated by the photothermal converter also accelerates the removability.

The laser engraving is advantageous in that since an engraving depth may be set arbitrarily, a structure may be three-dimensionally controlled. When, for example, a portion for fine dots being printed is engraved shallowly or with a shoulder, a relief does not topple by printing pressure. When a groove portion for fine outline characters being printed is engraved deeply, an ink is hardly filled in a groove and thereby outline characters are inhibited from collapsing.

When an infrared laser corresponding to the maximum absorption wavelength of the photothermal converter is used to engrave, heat is efficiently generated from the photothermal converter; accordingly, a sharp relief layer is obtained at higher sensitivity.

An infrared laser used in engraving is preferably a carbon dioxide laser or a semiconductor laser from the viewpoint of productivity, cost and the like, and particularly preferably a fiber-coupled semiconductor infrared laser, which will be detailed below.

[Plate-making Apparatus provided with Semiconductor Laser]

In general, a semiconductor laser is higher in efficiency of laser oscillation and less expensive than a $CO_2$ laser and may be more miniaturized. Because a semiconductor laser is small in size, a semiconductor laser may be readily arrayed. A beam diameter thereof may be controlled with a focusing lens and a specified optical fiber. A fiber-coupled semiconductor laser is effective in image formation in the invention because when an optical fiber is coupled to a semiconductor laser, it may output laser light more efficiently. Furthermore, by processing with a fiber, a beam shape may be controlled. For example, a beam profile may be formed into a top hat shape and thereby energy may be stably imparted on a plate surface. Details of the semiconductor lasers are described in "Laser Handbook (2nd edition)" edited by Laser Society, "Practical Laser Technique" edited by Electronic Communication Society.

A plate making apparatus provided with a fiber-coupled semiconductor laser preferably used in a method for producing a relief printing plate from a relief printing plate precursor of the invention is detailed in Japanese Patent Application Nos. 2008-15460 and 2008-58160, which were submitted by present applicants, and may be used in plate making of a relief printing plate according to the invention.

A semiconductor laser that is used in laser engraving may be used when a wavelength thereof is from 700 nm to 1300 nm. However, the semiconductor laser has a wavelength preferably from 800 nm to 1200 nm, more preferably from 860 nm to 1200 nm and particularly preferably from 900 nm to 1100 nm.

A band gap of GaAs is 860 nm at room temperature; accordingly, in a region less than 860 nm, a semiconductor laser having an AlGaAs active layer is generally used. On the other hand, in a region of 860 nm or more, a semiconductor laser of which semiconductor active layer material is InGaAs is used. Since Al generally tends to be oxidized and a semiconductor laser having an InGaAs active layer is higher in reliability compared to a semiconductor laser having an AlGaAs active layer, a wavelength from 860 nm to 1200 nm is desirable.

As to a more practically usable semiconductor laser, when a composition of cladding material are considered in addition to the active layer material, in a semiconductor laser having an InGaAs active layer, as a more preferable embodiment, a semiconductor laser having higher output power and higher reliability may be readily obtained in a wavelength range from 900 nm to 1100 nm. Accordingly, when a fiber-coupled semiconductor laser having an InGaAs active layer having a wavelength in the range of 900 nm to 1100 nm is employed, the low cost and high productivity may be more easily obtained.

In order to realize a laser engraving relief printing system that is less expensive, high in productivity and excellent in image quality, in addition to a relief printing plate precursor provided with a relief forming layer that uses a resin composition for laser engraving as specified in the invention, a fiber-coupled semiconductor laser having a specified wavelength as mentioned above is preferably used.

When a shape desired to engrave is controlled by use of a fiber-coupled semiconductor laser, a shape of an engraving area may be advantageously varied by varying a beam shape of a fiber-coupled semiconductor laser or by varying an amount of energy supplied to a laser without varying a beam shape.

After the above-mentioned step, there are engraving scraps adhered to an engraved surface; accordingly, it is preferred to perform the rinse step (3) where the engraved surface is rinsed with water or a liquid made mainly of water to rinse off the engraving scraps. Examples of rinse method includes a method where high-pressure water is sprayed, and a method where a batch or transfer brush washer known as a developer of a photosensitive resin anastatic printing plate is used to scrub an engraved surface with a brush in the presence mainly of water. According to the invention, the generated engraving scraps are free from sliminess but powdery; as a result, the scraps are effectively removed in the rinse step with water, that is, there is no need of using a soap-added rinse liquid.

When the rinse step (3) is applied to the engraved surface, a step (4) where a rinse liquid is volatilized by drying an engraved relief forming layer is preferably added.

Furthermore, as required, a step (5) where the relief forming layer is further crosslinked may be added. When an additional crosslinking step (5) (post-crosslinking treatment) is performed, a relief formed by engraving may be more strengthened.

As mentioned above, a relief printing plate having a relief layer on a surface of a substrate such as a support may be obtained.

A thickness of a relief layer that the relief printing plate has is preferably 0.05 mm or more but 10 mm or less, more preferably 0.05 mm or more but 7 mm or less and particularly preferably 0.05 mm or more but 3 mm or less, from the viewpoint of satisfying various printing suitability such as wear resistance and ink transferability.

The Shore A Hardness of a relief layer that the relief printing plate has is preferably 50° or more but 90° or less.

When the Shore A Hardness of the relief layer is 50° or more, fine dots formed by engraving do not fall and collapse even under strong pressure of an anastatic printing machine, and thereby proper printing may be performed. Furthermore, when the Shore A Hardness of the relief layer is 90° or less, print blur at a solid portion may be prevented even in flexographic printing with kiss-touch printing pressure.

The "Shore A hardness" in the present specification means a value measured by a durometer (spring type rubber hardness meter) that presses an indenter (referred to as a pressing needle or an indenter) to a surface of a measurement object to deform the surface, measures an amount of the deformation (pressing depth) and expresses the result in a numerical value.

The relief printing plate produced from a relief printing plate precursor of the invention allows printing with a relief printing machine using any of an aqueous ink, oily ink or UV ink, and also allows printing with a flexographic printing machine using UV ink. A relief printing plate obtained from the relief printing plate precursor of the invention is excellent in the rinse characteristics, free from residual engraving scraps and excellent in elasticity of the resulting relief layer. Accordingly, printing may be performed excellent in the ink transferability and printing durability and free from concerns of plastic deformation and deterioration of the printing durability of the relief layer over a long period of time.

EXAMPLES

In what follows, the invention will be described in more detail with reference to Examples, while the invention is not limited to the Examples.

A weight average molecular weight (Mw) of a polymer in each of the Examples is a value measured by a GPC method unless otherwise stated.

Example 1

1. Preparation of Crosslinkable Resin Composition for Laser Engraving

In a three necked flask equipped with a stirring blade and a cooling tube, 50 g of "DENKA BUTYRAL #3000-2" (trade name, manufactured by Denki Kagaku Kogyo Co., Ltd., polyvinyl butyral derivative, Mw: 90,000) as the polymer (B) and 47 g of propylene glycol monomethyl ether acetate as a solvent were charged and heated while stirring at 70° C. for 120 min to dissolve the polymer. Thereafter, the resultant solution was cooled to 40° C. and 15 g of a monomer (M-1) (having a chemical structure shown below) as a polymerizable compound (polyfunctional body) (D), 8 g of BLEMMER LMA (trade name, manufactured by NOF Corp.) as a polymerizable compound (monofunctional body: lauryl methacrylate), 1.6 g of t-butylperoxy benzoate (trade name: PERBUTYL Z, manufactured by NOF Corp.) as a polymerization initiator (E) and 1 g of KETCHEN BLACK EC600JD (trade name, carbon black, manufactured by Lion Corporation) as a photothermal converter (F) were further added and stirred for 30 min. Thereafter, 15 g of a compound (A) (S-1) [A structure thereof is shown below. Available under trade name: KBE-846 from Shin-Etsu Chemical Co., Ltd.] and 0.4 g of phosphoric acid as a catalyst (C) were added and stirred at 40° C. for 10 min. According to this operation, a coating liquid for crosslinkable relief forming layer 1 (crosslinkable resin composition for laser engraving) having fluidity was obtained.

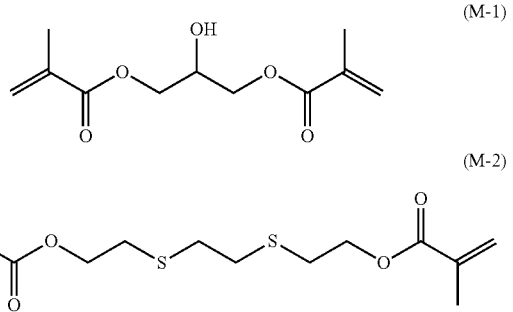

(M-1)

(M-2)

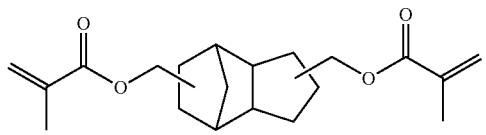

(M-3)

2. Preparation of Relief Printing Plate Precursor for Laser Engraving

A relief printing plate precursor for laser engraving 1 was prepared in such a manner that a spacer (frame) having a predetermined thickness was placed on a PET substrate, and the coating liquid 1 for crosslinkable relief forming layer obtained above was quietly cast within the spacer (frame) to an extent that does not overflow therefrom and dried in an oven at 70° C. for 3 hr, and thereby a relief forming layer having a thickness of substantially 1 mm was disposed.

3. Preparation of Relief Printing Plate

A relief forming layer of the resulting precursor was heated at 80° C. for 3 hr and further at 100° C. for 3 hr to thermally crosslink the relief forming layer.

The crosslinked relief forming layer was laser engraved with two kinds of laser.

A high-quality $CO_2$ laser marker ML-9100 series (trade name, manufactured by Keyence) was used as a $CO_2$ gas laser engraving device for engraving by laser irradiation. After a protective film was peeled off from the printing plate precursor 1 for laser engraving, a solid portion of 1 cm-square was subjected to raster engraving with the $CO_2$ gas laser engraving device under the conditions of output power: 12 W, head speed: 200 mm/second and pitch setting: 2,400 DPI.

A laser recording device equipped with a fiber-coupled semiconductor laser (FC-LD) SDL-6390 (trade name, manufactured by JDSU; wavelength: 915 nm) having the maximum output power of 8.0 W was used as a semiconductor laser engraving device. A solid portion of 1 cm-square was subjected to a raster engraving with a semiconductor laser engraving device under the conditions of laser output power: 7.5 W, head speed: 409 mm/second and pitch setting: 2,400 DPI.

A thickness of a relief layer that the relief printing plate had was substantially 1 mm.

The Shore A Hardness of the relief layer was measured according to the method described above and found to be 75°. The Shore A Hardness was measured similarly in the respective Examples and Comparative Examples described below.

Examples 2 to 50, Comparative Examples 1 to 5

1. Preparation of Crosslinkable Resin Composition for Laser Engraving

Coating liquids 2 to 50 for crosslinkable relief forming layer (crosslinkable resin compositions for laser engraving) and comparative coating liquids C1 to C5 for crosslinkable relief forming layer (crosslinkable resin compositions for laser engraving) were prepared in a manner similar to Example 1 except that the compound (A), the polymer (B) and the polymerizable compound (polyfunctional material) (D), which were used in Example 1, were changed to a compound (A), a polymer (B) or comparative binder polymer and a polymerizable compound (D) described in Tables 1 to 6 described below, and the alcohol exchange reaction catalyst (C) was changed as shown in Tables 1 to 6.

Details of the polymers (B) and comparative binder polymers used in the respective Examples and Comparative Examples are as shown below.

Specified polymer 1: DENKA BUTYRAL #3000-2 (trade name, manufactured by Denki Kagaku Kogyo Co., Ltd., polyvinyl butyral derivative, Mw: 90,000)

Specified polymer 2: acrylic resin: cyclohexyl methacrylate/2-hydroxyethyl methacrylate 70/30 (mole %) (Mw=50,000) (indicated as Acrylic Resin (*1) in the tables)

Specified polymer 3: novolak resin: novolak resin obtained from octyl phenol and formaldehyde (50/50 mole %) (Mw=20,000) (indicated as Novolak Resin (*2) in the tables)

Comparative polymer 1: TR2000 (trade name, manufactured by JSR, styrene-butadiene copolymer)

Comparative polymer 2: polyurethane resin: tolylene diisocyanate/polypropylene glycol (average molecular weight: 2000) 50/50 (mole %) (Mw=90,000) (indicated as Polyurethane (*3) in the tables)

Catalyst (C): "phosphoric acid (manufactured by Wako Pure Chemical Industries, Ltd.)", "methane sulfonic acid (manufactured by Wako Pure Chemical Industries, Ltd.)", "ethyl orthotitanate (manufactured by Wako Pure Chemical Industries, Ltd.)", "p-toluene sulfonic acid (manufactured by Wako Pure Chemical Industries, Ltd.)", "1,8-diazabicyclo[5.4.0]undec-7-ene (manufactured by Wako Pure Chemical Industries, Ltd.)", "1,5-diazabicyclo[4.3.0]non-5-ene (manufactured by Wako Pure Chemical Industries, Ltd.)", "diazabicyclo[2.2.2]octane (manufactured by Wako Pure Chemical Industries, Ltd.)", "hexamethylenetetramine (manufactured by Wako Pure Chemical Industries, Ltd.)", "triethylamine (manufactured by Wako Pure Chemical Industries, Ltd.)", "1,1,3,3-tetramethylguanidine (manufactured by Wako Pure Chemical Industries, Ltd.)" "N,N-dimethylaniline (manufactured by Wako Pure Chemical Industries, Ltd.)", and "EPOMIN SP-006 (trade name, manufactured by Nippon Shokubai Co., Ltd.)".

Monomers (M-1), (M-2) and (M-3) that are polymerizable compounds (D) are compounds having the above-mentioned structures.

Structures of the compounds (A) used in the respective Examples and Comparative Examples and described in Tables 1 to 6 shown below and synthesis examples of (S-26), (S-27) and (S-30) among these compounds (A) are shown below. A silane coupling agent KR-217 used in Example 27 is a product (silicone alkoxyoligomer) commercially available from Shin-Etsu Chemical Co., Ltd., of which structure is not disclosed.

S-1

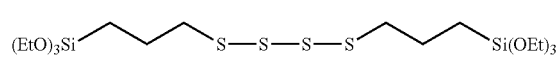

S-2

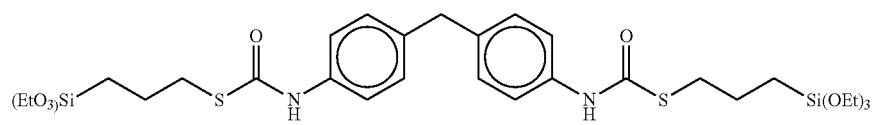

S-3

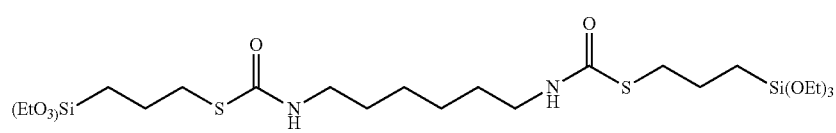

S-4

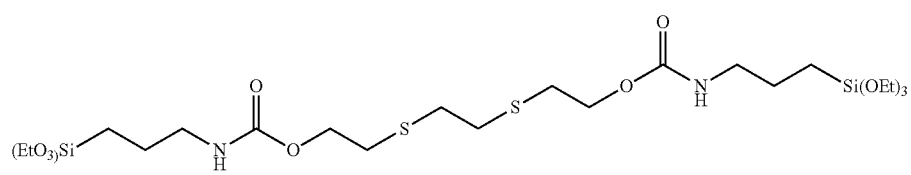

S-5

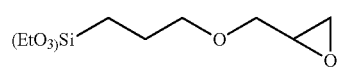

S-6

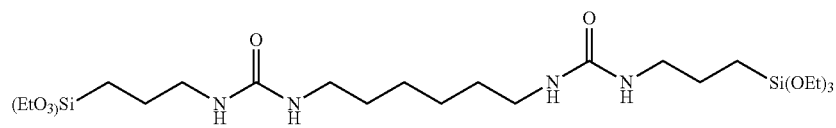

-continued
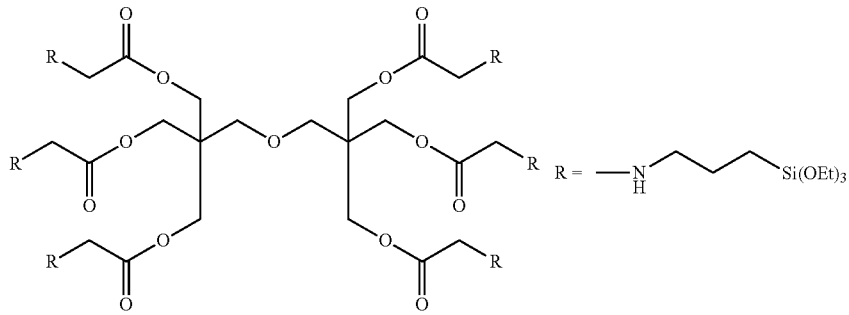
S-7
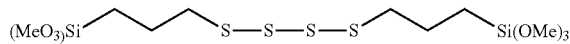
S-8
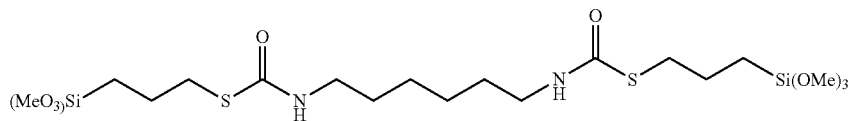
S-9
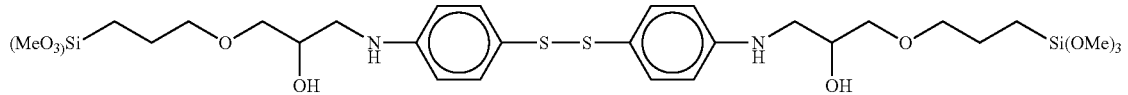
S-10
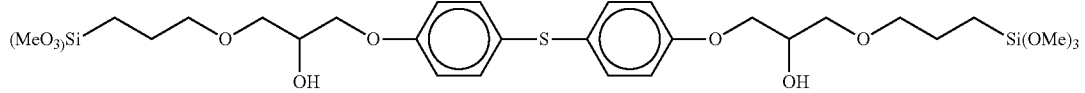
S-11
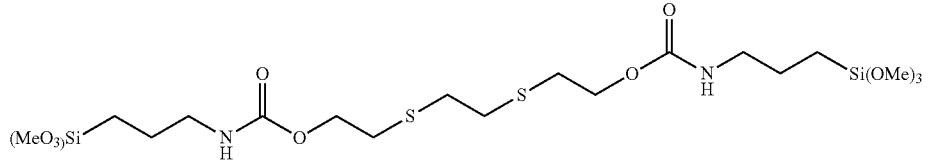
S-12
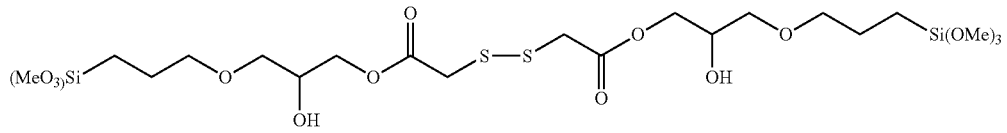
S-13
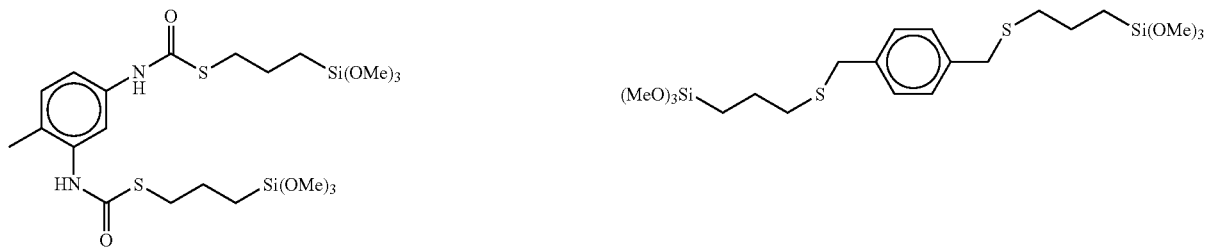
S-14
S-15
S-16
S-17
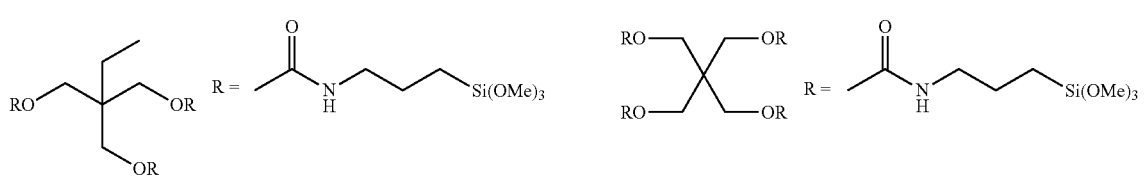
S-18
S-19

-continued
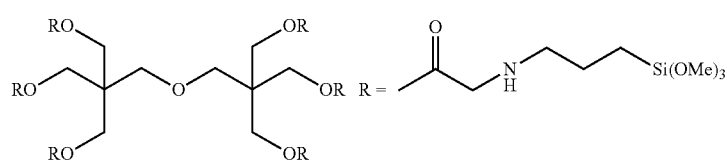
S-20
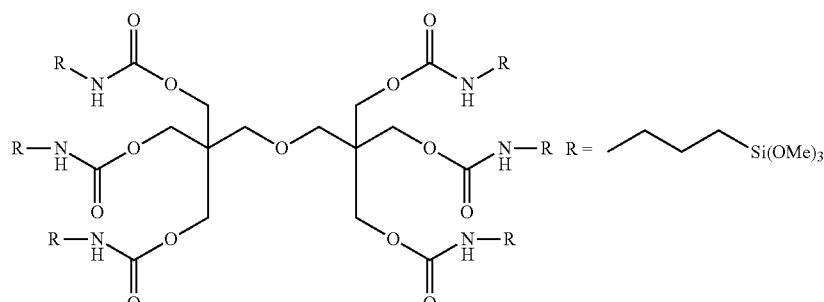
S-21
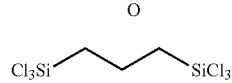
S-22
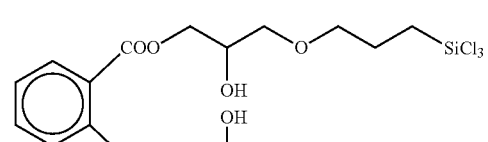
S-23
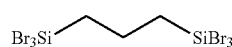
S-24
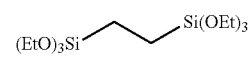
S-25
Mixture of
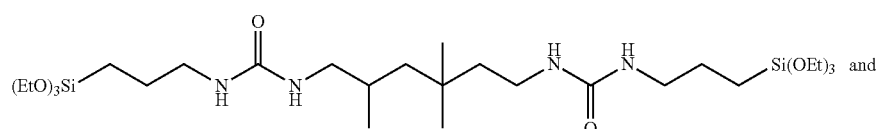
(S-26)
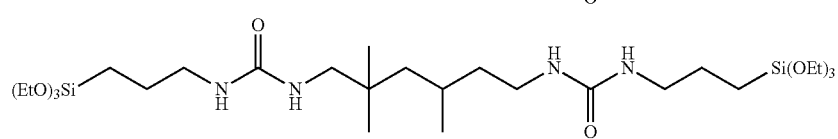
and
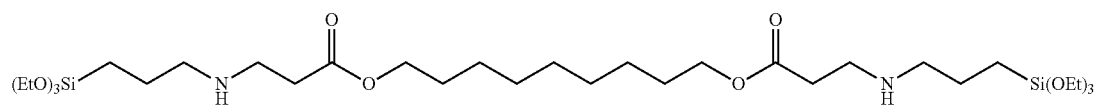
(S-27)
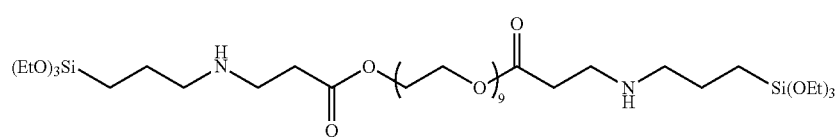
(S-28)
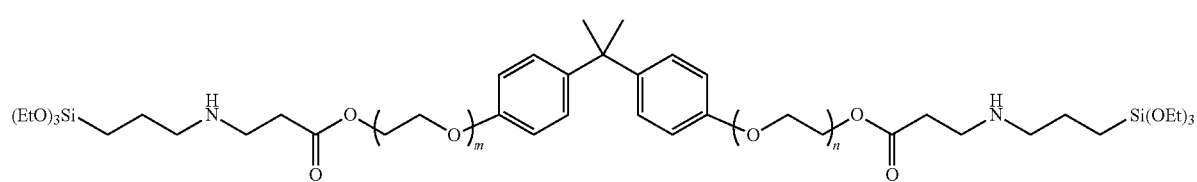
(S-29)
$n + m = 4$

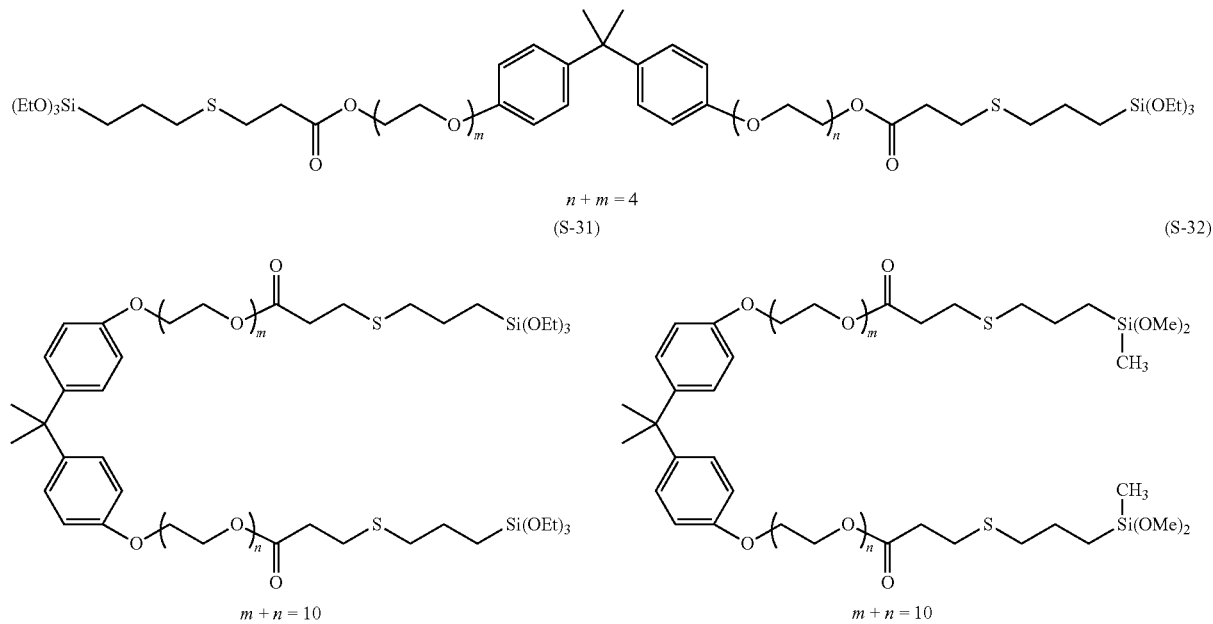

$n + m = 4$ $m + n = 10$ $m + n = 10$

Synthesis Example 1

Synthesis of (S-26)

In a 100 mL three necked flask with a stirring blade and a cooling tube, 20.34 g of 3-aminopropyltriethoxysilane (manufactured by Tokyo Kasei Kogyo Co., Ltd.) and 7.50 g of 2-butanone (manufactured by Wako Pure Chemical Industries Ltd.) were charged, followed by dropping 9.66 g of trimethylhexamethylene diisocyanate (a mixture of 2,2,4-substitution product and a 2,4,4-substitution product, manufactured by Tokyo Kasei Kogyo Co., Ltd.) under room temperature over 30 min. After dropping, the solution was stirred under room temperature for 1 hr, followed by removing 2-butanone under reduced pressure, thereby a compound (A) (S-26: mixture of two kinds of the structure) (29.54 g) was obtained. A structure of the resulting compound (A) (S-26) was identified by $^1$H NMR.

Synthesis Example 2

Synthesis of (S-27)

In a 100 mL three necked flask with a stirring blade and a cooling tube, 18.68 g of 3-aminopropyltriethoxysilane (manufactured by Tokyo Kasei Kogyo Co., Ltd.) and 7.50 g of 2-butanone (manufactured by Wako Pure Chemical Industries Ltd.) were charged, followed by dropping 11.32 g of 1,9-bis(acryloyloxy)nonane (manufactured by Tokyo Kasei Kogyo Co., Ltd.) under room temperature over 30 min. After dropping, the solution was heated to 70° C. and stirred for 4 hr, followed by removing 2-butanone under reduced pressure, thereby a compound (A) (S-27: having the above-mentioned structure) (29.18 g) was obtained. A structure of the resulting compound (A) (S-27) was identified by $^1$H NMR.

Synthesis Example 3-1

Synthesis Example 1 of (S-30)

In a 100 mL three necked flask with a stirring blade and a cooling tube, 15.54 g of NK ESTER A-BPE-4 (trade name, manufactured by Shin-Nakamura Kogyo Co., Ltd.) and 0.06 g of 1,8-diazabicyclo[5.4.0]undec-7-ene (manufactured by Wako Pure Chemical Industries Ltd.) were charged, followed by dropping 14.46 g of KBE-803 (trade name, manufactured by Shin-Etsu Chemical Co., Ltd.) under room temperature over 30 min. After dropping, the solution was stirred under room temperature for 2 hr, thereby a compound (A) (S-30: having the above-mentioned structure) (29.42 g) was obtained. A structure of the resulting compound (A) (S-30) was identified by $^1$H NMR.

The compound (A) (S-30) having the above-mentioned structure may also be synthesized by a method other than the above-mentioned method. In what follows, other synthesis examples will be described.

Synthesis Example 3-2

Synthesis Example 2 of (S-30)

In a 100 mL three necked flask with a stirring blade and a cooling tube, 15.54 g of NK ESTER A-BPE-4 (trade name, manufactured by Shin-Nakamura Kogyo Co., Ltd.) and 0.06 g of EPOMINE SP-006 (trade name, manufactured by Nippon Shokubai Co., Ltd.) were charged, followed by dropping 14.46 g of KBE-803 (trade name, manufactured by Shin-Etsu Chemical Co., Ltd.) under room temperature over 30 min. After dropping, the solution was stirred under room temperature for 2 hr, thereby a compound (A) (S-30) (29.11 g) was obtained. A structure of the resulting compound (A) (S-30) was identified by $^1$H NMR.

Synthesis Example 3-3

Synthesis Example 3 of (S-30)

In a 100 mL three necked flask with a stirring blade and a cooling tube, 15.54 g of NK ESTER A-BPE-4 (trade name, manufactured by Shin-Nakamura Chemical Co., Ltd.), 14.46 g of KBE-803 (trade name, manufactured by Shin-Etsu Chemical Co., Ltd.), 30.00 g of 2-butanone (manufactured by Wako Pure Chemical Industries Ltd.) and 0.10 g of V-65 (trade name, manufactured by Wako Pure Chemical Industries Ltd.) were charged, followed by heating to 70° C. and stirring for 4 hr. After the reaction, 2-butanone was removed under reduced pressure, thereby a compound (A) (S-30) (29.38 g) was obtained. A structure of the resulting compound (A) (S-30) was identified by $^1$H NMR.

NK ESTER A-BPE-4 (trade name, manufactured by Shin-Nakamura Kogyo Co., Ltd.), KBE-803 (trade name, manufactured by Shin-Etsu Chemical Co., Ltd.), and EPOMIN SP-006 (trade name, manufactured by Nippon Shokubai Co., Ltd.), which were used in the above synthesis examples, are compounds having the following formulas.

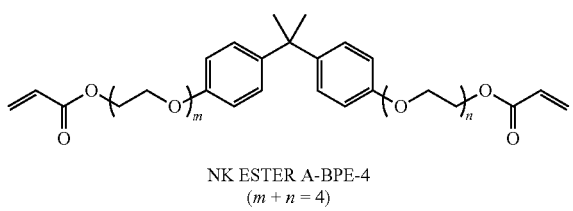

NK ESTER A-BPE-4
(m + n = 4)

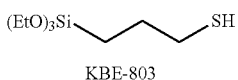

KBE-803

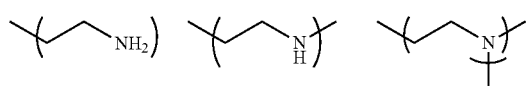

EPOMIN SP-006
(molecular weight: 600)

2. Preparation of Relief Printing Plate Precursor for Laser Engraving

Relief printing plate precursors 2 to 50 for laser engraving of Examples and relief printing plate precursors C1 to C5 for laser engraving of Comparative Examples were prepared in a manner similar to Example 1 except that a coating liquid 1 for crosslinkable relief forming layer in Example 1 was changed to coating liquids 2 to 45 for crosslinkable relief forming layer and comparative coating liquids C1 to C3 for crosslinking relief forming layer.

3. Preparation of Relief Printing Plate

A relief forming layer of each of relief printing plate precursors 2 to 50 and C1 to C5 for laser engraving was, in a manner similar to Example 1, heated to crosslink, followed by engraving to form a relief layer, thereby relief printing plates 2 to 50 of Examples and comparative relief printing plates C1 to C5 of Comparative Example were obtained.

A thickness of a relief layer of each of these relief printing plates was substantially 1 mm.

TABLE 1

| | (B) Polymer | (A) Compound | | | | (C) Catalyst | (D) Polymerizable Compound |
|---|---|---|---|---|---|---|---|
| | | Compound | Number of Si Atoms | Hydrolyzable group (functional group bonded to Si atom) | Presence of S Atom | | |
| Example 1 | #3000-2 | S-1 | 2 | Ethoxy group | Present | Phosphoric acid | M-1 |
| Example 2 | #3000-2 | S-2 | 2 | Ethoxy group | Present | Phosphoric acid | M-1 |
| Example 3 | #3000-2 | S-3 | 2 | Ethoxy group | Present | Phosphoric acid | M-1 |
| Example 4 | #3000-2 | S-4 | 2 | Ethoxy group | Present | Phosphoric acid | M-1 |
| Example 5 | #3000-2 | S-5 | 1 | Ethoxy group | Absent | Phosphoric acid | M-1 |
| Example 6 | #3000-2 | S-6 | 2 | Ethoxy group | Absent | Phosphoric acid | M-2 |
| Example 7 | #3000-2 | S-7 | 6 | Ethoxy group | Absent | Phosphoric acid | M-2 |
| Example 8 | #3000-2 | S-8 (polymerizable compound was not used together) | 2 | Methoxy group | Present | Phosphoric acid | — |
| Example 9 | #3000-2 | S-8 | 2 | Methoxy group | Present | Phosphoric acid | M-2 |
| Example 10 | #3000-2 | S-9 | 2 | Methoxy group | Present | Phosphoric acid | M-2 |
| Example 11 | #3000-2 | S-10 | 2 | Methoxy group | Present | Phosphoric acid | M-2 |
| Example 12 | #3000-2 | S-11 | 2 | Methoxy group | Present | Phosphoric acid | M-2 |
| Example 13 | #3000-2 | S-12 | 2 | Methoxy group | Present | Phosphoric acid | M-2 |
| Example 14 | #3000-2 | S-13 | 2 | Methoxy group | Present | Phosphoric acid | M-2 |
| Example 15 | #3000-2 | S-14 | 2 | Methoxy group | Present | Phosphoric acid | M-2 |

TABLE 1-continued

| | | Performance Evaluation | | | | |
|---|---|---|---|---|---|---|
| | Rinse characteristics | Film Elasticity (plastic deformation ratio) | Printing Durability (m) | Ink Transfer ability | Engraving Depth (μm) (FC-LD) | Engraving Depth (μm) (CO$_2$ laser) |
| Example 1 | B | 8% | 1800 | A | 430 | 344 |
| Example 2 | B | 7% | 1800 | A | 425 | 340 |
| Example 3 | B | 9% | 1900 | A | 425 | 340 |
| Example 4 | B | 8% | 1800 | A | 430 | 344 |
| Example 5 | B | 9% | 1800 | A | 390 | 312 |
| Example 6 | B | 9% | 1900 | A | 390 | 312 |
| Example 7 | B | 8% | 1800 | A | 380 | 304 |
| Example 8 | B | 9% | 1800 | A | 420 | 336 |
| Example 9 | A | 5% | 2000 | A | 420 | 336 |
| Example 10 | A | 5% | 2100 | A | 420 | 336 |
| Example 11 | A | 6% | 2000 | A | 425 | 340 |
| Example 12 | A | 5% | 2000 | A | 415 | 332 |
| Example 13 | A | 5% | 2000 | A | 425 | 340 |
| Example 14 | A | 5% | 2000 | A | 423 | 338 |
| Example 15 | A | 6% | 2100 | A | 420 | 336 |

TABLE 2

| | (B) Polymer | (A) Compound | | | | (C) Catalyst | (D) Polymerizable Compound |
|---|---|---|---|---|---|---|---|
| | | Compound | The Number of Si Atoms | Hydrolyzable group (functional group bonded to Si atom) | Presence of S Atom | | |
| Example 16 | #3000-2 | S-15 | 2 | Methoxy group | Present | Phosphoric acid | M-2 |
| Example 17 | #3000-2 | S-16 | 1 | Methoxy group | Absent | Phosphoric acid | M-2 |
| Example 18 | #3000-2 | S-17 | 2 | Methoxy group | Absent | Phosphoric acid | M-2 |
| Example 19 | #3000-2 | S-18 | 3 | Methoxy group | Absent | Phosphoric acid | M-2 |
| Example 20 | #3000-2 | S-19 | 4 | Methoxy group | Absent | Phosphoric acid | M-2 |
| Example 21 | #3000-2 | S-20 | 6 | Methoxy group | Absent | Phosphoric acid | M-2 |
| Example 22 | #3000-2 | S-21 | 6 | Methoxy group | Absent | Phosphoric acid | M-2 |
| Example 23 | #3000-2 | S-22 | 2 | Cl | Absent | Phosphoric acid | M-2 |
| Example 24 | #3000-2 | S-23 | 2 | Cl | Absent | Phosphoric acid | M-2 |
| Example 25 | #3000-2 | S-24 | 2 | Br | Absent | Phosphoric acid | M-2 |
| Example 26 | #3000-2 | S-25 | 2 | Ethoxy group | Absent | Phosphoric acid | M-2 |
| Example 27 | #3000-2 | KR-217 | unclear | Methoxy group | Absent | Phosphoric acid | M-2 |

| | Performance Evaluation | | | | | |
|---|---|---|---|---|---|---|
| | Rinse characteristics | Film Elasticity (plastic deformation ratio) | Printing Durability (m) | Ink Transfer ability | Engraving Depth (μm) (FC-LD) | Engraving Depth (μm) (CO$_2$ laser) |
| Example 16 | A | 5% | 2100 | A | 420 | 336 |
| Example 17 | A | 8% | 2100 | A | 380 | 304 |
| Example 18 | A | 5% | 2000 | A | 380 | 304 |
| Example 19 | A | 5% | 2000 | A | 380 | 304 |
| Example 20 | A | 4% | 2000 | A | 385 | 308 |
| Example 21 | A | 5% | 2000 | A | 370 | 296 |
| Example 22 | A | 5% | 2000 | A | 370 | 296 |
| Example 23 | BC | 10% | 1600 | A | 380 | 304 |
| Example 24 | BC | 10% | 1600 | A | 360 | 288 |
| Example 25 | BC | 10% | 1500 | A | 360 | 288 |
| Example 26 | A | 4% | 2150 | A | 425 | 343 |
| Example 27 | A | 4% | 2100 | A | 428 | 345 |

TABLE 3

| | (B) Polymer | (A) Compound | | | | (C) Catalyst | (D) Polymerizable Compound |
|---|---|---|---|---|---|---|---|
| | | Compound | The Number of Si Atoms | Hydrolyzable group (functional group bonded to Si atom) | Presence of S Atom | | |
| Example 28 | Acrylic Resin (*1) | S-1 | 2 | Ethoxy group | Present | Phosphoric acid | M-2 |
| Example 29 | Novolak Resin (*2) | S-1 | 2 | Ethoxy group | Present | Phosphoric acid | M-2 |
| Example 30 | #3000-2 | S-1 | 2 | Ethoxy group | Present | Methane sulfonic acid | M-2 |
| Example 31 | #3000-2 | S-1 | 2 | Ethoxy group | Present | Ethyl Ortho titanate | M-2 |
| Example 32 | #3000-2 | S-1 | 2 | Ethoxy group | Present | p-toluene sulfonic acid | M-2 |
| Comparative Example 1 | #3000-2 | None | — | — | Absent | None | M-2 |
| Comparative Example 2 | TR2000 (SBR manufactured by JSR) | Sulfur | — | — | Present | None | M-2 |
| Comparative Example 3 | Polyurethane (*3) | None | — | — | Absent | None | M-2 |

| | Rinse characteristics | Film Elasticity (plastic deformation ratio) | Printing Durability (m) | Ink Transfer ability | Engraving Depth (μm) (FC-LD) | Engraving Depth (μm) (CO$_2$ laser) |
|---|---|---|---|---|---|---|
| Example 28 | BC | 10% | 1600 | A | 380 | 304 |
| Example 29 | BC | 10% | 1600 | A | 384 | 307 |
| Example 30 | B | 7% | 1800 | A | 420 | 336 |
| Example 31 | B | 8% | 1800 | A | 420 | 336 |
| Example 32 | B | 7% | 1800 | A | 425 | 340 |
| Comparative Example 1 | D | 35% | 500 m | C | 345 | 276 |
| Comparative Example 2 | D | 5% | 2000 m | A | 290 | 232 |
| Comparative Example 3 | D | 30% | 600 m | C | 380 | 304 |

TABLE 4

| | (B) Polymer | (A) Compound | | | | (C) Catalyst | (D) Polymerizable Compound |
|---|---|---|---|---|---|---|---|
| | | Compound | The Number of Si Atoms | Hydrolyzable group (functional group bonded to Si atom) | Presence of S Atom | | |
| Example 33 | #3000-2 | S-1 | 2 | Ethoxy group | Present | 1,8-diazabicyclo[5.4.0]undec- | M-2 |
| Example 34 | #3000-2 | S-1 | 2 | Ethoxy group | Present | 1,5-diazabicyclo[4.3.0]non- | M-2 |
| Example 35 | #3000-2 | S-1 | 2 | Ethoxy group | Present | diazabicyclo[2.2.2]octane | M-2 |
| Example 36 | #3000-2 | S-1 | 2 | Ethoxy group | Present | Hexamethylenetetramine | M-2 |
| Example 37 | #3000-2 | S-1 | 2 | Ethoxy group | Present | Triethylamine | M-2 |
| Example 38 | #3000-2 | S-1 | 2 | Ethoxy group | Present | 1,1,3,3-tetramethylguanidine | M-2 |
| Example 39 | #3000-2 | S-1 | 2 | Ethoxy group | Present | N,N-dimethylaniline | M-2 |

| | Rinse characteristics | Film Elasticity (plastic deformation ratio) | Printing Durability (m) | Ink Transfer ability | Engraving Depth (μm) (FC-LD) | Engraving Depth (μm) (CO$_2$ laser) |
|---|---|---|---|---|---|---|
| Example 33 | A | 4% | 2200 | A | 430 | 348 |
| Example 34 | A | 4% | 2200 | A | 428 | 343 |
| Example 35 | B | 6% | 1950 | A | 420 | 333 |
| Example 36 | B | 7% | 1900 | A | 422 | 338 |
| Example 37 | A | 6% | 2000 | A | 420 | 334 |
| Example 38 | A | 5% | 2100 | A | 425 | 340 |
| Example 39 | B | 6% | 2000 | A | 420 | 336 |

TABLE 5

| | (B) Polymer | (A) Compound Com- pound | The Number of Si Atoms | Hydrolyzable group (functional group bonded to Si atom) | Presence of S Atom | (C) Catalyst | (D) Polymerizable Compound |
|---|---|---|---|---|---|---|---|
| Example 40 | #3000-2 | S-26 | 2 | Ethoxy group | Absent | Phosphoric acid | M-2 |
| Example 41 | #3000-2 | S-27 | 2 | Ethoxy group | Absent | Phosphoric acid | M-2 |
| Example 42 | #3000-2 | S-28 | 2 | Ethoxy group | Absent | Phosphoric acid | M-2 |
| Example 43 | #3000-2 | S-29 | 2 | Ethoxy group | Absent | Phosphoric acid | M-2 |
| Example 44 | #3000-2 | S-30 | 2 | Ethoxy group | Present | Phosphoric acid | M-2 |
| Example 45 | #3000-2 | S-1 | 2 | Ethoxy group | Present | EPOMINE SP-006 | M-2 |

| | Performance Evaluation | | | | |
|---|---|---|---|---|---|
| | Rinse characteristics | Film Elasticity (plastic deformation ratio) | Printing Durability (m) | Ink Transfer ability | Engraving Depth (μm) (FC-LD) | Engraving Depth (μm) ($CO_2$ laser) |
| Example 40 | A | 4% | 2200 | A | 425 | 343 |
| Example 41 | A | 4% | 2050 | A | 428 | 345 |
| Example 42 | A | 4% | 2100 | A | 430 | 348 |
| Example 43 | A | 4% | 2200 | A | 428 | 343 |
| Example 44 | A | 4% | 2250 | A | 435 | 348 |
| Example 45 | A | 4% | 2200 | A | 430 | 348 |

TABLE 6

| | (B) Polymer | (A) Compound Com- pound | The Number of Si Atoms | Hydrolyzable group (functional group bonded to Si atom) | Presence of S Atom | (C) Catalyst | (D) Polymerizable Compound |
|---|---|---|---|---|---|---|---|
| Example 46 | #3000-2 | S-1 | 2 | Ethoxy group | Present | None | M-1 |
| Example 47 | #3000-2 | S-1 | 2 | Ethoxy group | Present | Phosphoric acid | None |
| Example 48 | #3000-2 | S-31 | 2 | Ethoxy group | Present | 1,8-diazabicyclo[5.4.0]undec-7-ene | M-2 |
| Example 49 | #3000-2 | S-32 | 2 | Methoxy group | Present | 1,8-diazabicyclo[5.4.0]undec-7-ene | M-2 |
| Example 50 | #3000-2 | S-32 | 2 | Methoxy group | Present | 1,8-diazabicyclo[5.4.0]undec-7-ene | M-3 |
| Comparative Example 4 | DENKA SAKUNOL SN-17A (polyvinyl acetate) | S-1 | 2 | Ethoxy group | Present | Phosphoric acid | M-1 |
| Comparative Example 5 | Polyurethane (*3) | None | — | — | Absent | None | M-1 |

| | Performance Evaluation | | | | | |
|---|---|---|---|---|---|---|
| | Rinse characteristics | Film Elasticity (plastic deformation ratio) | Printing Durability (m) | Ink Transfer ability | Engraving Depth (μm) (FC-LD) | Engraving Depth (μm) ($CO_2$ laser) |
| Example 46 | BC | 12% | 1400 | B | 420 | 330 |
| Example 47 | BC | 12% | 1400 | B | 410 | 320 |
| Example 48 | A | 4% | 2200 | A | 420 | 336 |
| Example 49 | A | 4% | 2200 | A | 425 | 340 |
| Example 50 | A | 4% | 2400 | A | 425 | 340 |
| Comparative Example 4 | D | 14% | 1000 | C | 420 | 310 |
| Comparative Example 5 | C | 10% | 1200 | BC | 380 | 300 |

4. Evaluation of Relief Printing Plate

Performance evaluation was carried out of items described below of the relief printing plates and results thereof are shown in Tables 1 to 6.

(4-1) Engraving Depth

An "engraving depth" of each of the relief layers obtained by laser engraving the relief forming layers of the relief printing plate precursors 1 to 50 and C1 to C5 was measured as described below. The "engraving depth" herein means a difference between an engraved position (height) and a non-engraved position (height) when a cross section of the relief layer was observed. The "engraving depth" in present Examples was measured by observing the cross section of the relief layer with a super depth color 3D measuring microscope (trade name: VK9510, manufactured by Keyence Corporation). The engraving sensitivity is higher when the engraving depth is larger. The evaluation results of the engraving depth are shown in the following Tables 1 and 6 for every kinds of laser.

(4-2) Rinse Characteristics

A laser engraved plate was dipped in water and an engraved portion was rubbed 10 times with a toothbrush (trade name: CLINICA HABURASI FLAT, manufactured by Lion Corporation). After the rubbing, the presence of scraps on a rubbed surface of the relief forming layer was observed with an optical microscope. A laser engraved plate having no scraps was evaluated as A, a laser engraved plate having almost no scraps was evaluated as B, a laser engraved plate having slight scraps is evaluated as C, and a laser engraved plate from which scraps could not be removed was evaluated as D.

(4-3) Film Elasticity

Each of the relief forming layers of relief printing plate precursors 1 to 50 and C1 to C5 was measured with a microhardness meter (a dynamic hardness meter manufactured by SHIMADZU CORPORATION) under the measurement conditions of a testing load of 1.0 mN, a loading velocity of 0.023699 mN/sec, a duration of 5 sec, and a displacement scale of 10 μm to obtain a plastic deformation ratio between before and after indentation. The measurement was carried out three times, and the average value thereof is shown in the tables.

(4-4) Printing Durability

An obtained relief printing plate was set on a printing machine (trade name: ITM-4 Type, manufactured by Iyo Kikai Seisakusho Co., Ltd.), printing was continued with a non-diluted aqueous ink AQUA SPZ 16 RED (trade name, manufactured by TOYO INK MFG. Co., Ltd.) as an ink and with FULL COLOR FORM M 70 (trade name, manufactured by Nippon Seishi Co., Ltd.) as a printing paper, and a highlight from 1 to 10% was confirmed on a printed matter. A portion where unprinted dots were generated was taken as a print end and a length (meter) of a printed paper up to the print end was taken as an index. It is evaluated that the larger the numerical value is, the more excellent the printing durability is.

(4-5) Ink Transferability

In the evaluation of the printing durability, a degree of adhesion of an ink of a solid image portion on a printed matter was visually compared at 500 m and 1000 m from the start of printing.

A printed matter printed uniformly without density irregularity was evaluated as A, a printed matter printed with irregularity was evaluated as C, and a printed matter being intermediate between A and C was evaluated as B.

As shown in Tables 1 to 5, it is found that relief printing plates of Examples, which were prepared with a resin composition for laser engraving that contains a compound (A) such as a silane coupling agent (A-1) and a polymer (B), are superior to relief printing plates of Comparative Examples in the rinse characteristics and higher in productivity during plate making. Furthermore, it is found that the elasticity, ink transferability and printing durability of the relief layer are excellent, an excellent printing property may be exerted over a long period of time and since the engraving depth is large, the engraving sensitivity is excellent. On the other hand, relief layers of Comparative Examples were poor in the rinse characteristics irrespective of whether the elasticity is good or bad.

When Examples 1 to 3 and Examples 4 to 6 are compared, it is found that the compound (A) having an S atom in a molecule is deeper in the engraving depth and higher in the sensitivity.

Furthermore, in the case where the same relief printing plate precursor is used, it is found that when a plate making apparatus that is equipped with a fiber-coupled semiconductor laser and uses FC-LD as a light source is used, the engraving depth may be further improved.

This application claims priority from Japanese Patent Application No. 2009-024715 filed on Feb. 5, 2009, Japanese Patent Application No. 2009-187937 filed on Aug. 14, 2009, and Japanese Patent Application No. 2009-238681 filed on Oct. 15, 2009, the disclosures of which are incorporated by reference herein.

All publications, patent applications, and technical standards mentioned in this specification are herein incorporated by reference to the same extent as if each individual publication, patent application, or technical standard was specifically and individually indicated to be incorporated by reference.

The invention claimed is:

1. A method for producing a relief printing plate precursor for laser engraving comprising in this order: (1) forming a resin composition layer for laser engraving comprising a resin composition for laser engraving; and (2) crosslinking the resin composition layer for laser engraving by light and/or heat to form a crosslinked relief forming layer, wherein
the resin composition for laser engraving comprises: a compound (A) having at least one of a hydrolyzable silyl group and a silanol group; and a binder polymer (B) having a functional group capable of forming a crosslinked structure by reacting with the at least one of a hydrolyzable silyl group and a silanol group, and wherein
the functional group capable of forming a crosslinked structure by reacting with the at least one of a hydrolyzable silyl group and a silanol group is at least one selected from the group consisting of a hydroxyl group, an alkoxy group, a silanol group and a hydrolyzable silyl group.

2. The method for producing a relief printing plate precursor for laser engraving of claim 1, wherein the step (2) comprises crosslinking the resin composition layer for laser engraving by heat.

3. The method for producing a relief printing plate precursor for laser engraving of claim 2, wherein the compound (A) having at least one of a hydrolyzable silyl group and a silanol group is a compound having two or more hydrolyzable silyl groups.

4. The method for producing a relief printing plate precursor for laser engraving of claim 2, wherein the hydrolyzable silyl group in the compound (A) having at least one of a hydrolyzable silyl group and a silanol group is a hydrolyzable silyl group where at least one of an alkoxy group or a halogen atom is directly bonded to a Si atom.

5. The method for producing a relief printing plate precursor for laser engraving of claim 2, wherein the compound (A) having at least one of a hydrolyzable silyl group and a silanol group is a silane coupling agent.

6. The method for producing a relief printing plate precursor for laser engraving of claim 2, wherein the functional group capable of forming a crosslinked structure by reacting with the at least one of a hydrolyzable silyl group and a silanol group in the binder polymer (B) is a hydroxyl group.

7. The method for producing a relief printing plate precursor for laser engraving of claim 2, wherein the binder polymer (B) has a glass transition temperature (Tg) of from 20° C. to less than 200° C.

8. The method for producing a relief printing plate precursor for laser engraving of claim 2, wherein the binder polymer (B) is at least one selected from the group consisting of an acrylic resin, polyvinyl butyral and a derivative thereof.

9. The method for producing a relief printing plate precursor for laser engraving of claim 8, wherein the binder polymer (B) is at least one selected from the group consisting of polyvinyl butyral and a derivative thereof.

10. The method for producing a relief printing plate precursor for laser engraving of claim 2, wherein the resin composition for laser engraving further comprises a catalyst (C) for alcohol exchange reaction.

11. The method for producing a relief printing plate precursor for laser engraving of claim 2, wherein the resin composition for laser engraving further comprises a polymerizable compound (D).

12. The method for producing a relief printing plate precursor for laser engraving of claim 2, wherein the resin composition for laser engraving further comprises a polymerization initiator (E).

13. The method for producing a relief printing plate precursor for laser engraving of claim 2, wherein the resin composition for laser engraving further comprises a photothermal converter (F) capable of absorbing light having a wavelength of from 700 to 1300 nm.

14. A relief printing plate precursor for laser engraving comprising a relief forming layer that is formed from a resin composition for laser engraving, wherein
the resin composition for laser engraving comprises: a compound (A) having at least one of a hydrolyzable silyl group and a silanol group; and a binder polymer (B) having a functional group capable of forming a crosslinked structure by reacting with the at least one of a hydrolyzable silyl group and a silanol group, and wherein
the functional group capable of forming a crosslinked structure by reacting with the at least one of a hydrolyzable silyl group and a silanol group is at least one selected from the group consisting of a hydroxyl group, an alkoxy group, a silanol group and a hydrolyzable silyl group.

15. A relief printing plate precursor for laser engraving comprising a relief forming layer having a crosslinked structure formed by crosslinking a resin composition layer for laser engraving comprising a resin composition for laser engraving by light and/or heat, wherein
the resin composition for laser engraving comprises: a compound (A) having at least one of a hydrolyzable silyl group and a silanol group; and a binder polymer (B) having a functional group capable of forming a crosslinked structure by reacting with the at least one of a hydrolyzable silyl group and a silanol group, and wherein
the functional group capable of forming a crosslinked structure by reacting with the at least one of a hydrolyzable silyl group and a silanol group is at least one selected from the group consisting of a hydroxyl group, an alkoxy group, a silanol group and a hydrolyzable silyl group.

16. A method for producing a relief printing plate comprising in this order: (1) forming a resin composition layer for laser engraving comprising a resin composition for laser engraving; (2) crosslinking the resin composition layer for laser engraving by light and/or heat to form a crosslinked relief forming layer; and (3) forming a relief layer by laser engraving the crosslinked relief forming layer, wherein
the resin composition for laser engraving, comprises: a compound (A) having at least one of a hydrolyzable silyl group and a silanol group; and a binder polymer (B) having a functional group capable of forming a crosslinked structure by reacting with the at least one of a hydrolyzable silyl group and a silanol group, and wherein
the functional group capable of forming a crosslinked structure by reacting with the at least one of a hydrolyzable silyl group and a silanol group is at least one selected from the group consisting of a hydroxyl group, an alkoxy group, a silanol group and a hydrolyzable silyl group.

17. A relief printing plate comprising a relief layer produced by the method for producing a relief printing plate of claim 16.

18. The relief printing plate of claim 17, wherein a thickness of the relief layer is from 0.05 mm to 10 mm.

19. The relief printing plate of claim 17, wherein a Shore A hardness of the relief layer is from 50° to 90°.

20. The method for producing a relief printing plate precursor for laser engraving according to claim 2, wherein the at least one of the hydrolyzable silyl group and the silanol group is represented by the following formula (1);

wherein, in the formula (1), $R^1$ to $R^3$ each independently represent a hydrolyzable group selected from the group consisting of an alkoxy group, an aryloxy group, a mercapto group, a halogen atom, an amide group, an acetoxy group, an amino group, and an isopropenoxy group, a hydroxyl group, a hydrogen atom, or a monovalent organic group; at least one of $R^1$ to $R^3$ represents a hydrolyzable group selected from the group consisting of an alkoxy group, an aryloxy group, a mercapto group, a halogen atom, an amide group, an acetoxy group, an amino group, and an isopropenoxy group, or a hydroxyl group.

21. The method for producing a relief printing plate precursor for laser engraving according to claim 2, wherein the number of silicon atoms contained in compound (A) is from 2 to 6.

22. The method for producing a relief printing plate precursor for laser engraving according to claim 2, wherein the number of silicon atoms contained in compound (A) is 2 or 3.

23. The method for producing a relief printing plate precursor for laser engraving according to claim 20, wherein the total number of the hydrolyzable groups in formula (1) is 2 or 3.

24. The method for producing a relief printing plate precursor for laser engraving according to claim 20, wherein three hydrolyzable groups are bonded to a silicon atom.

25. The method for producing a relief printing plate precursor for laser engraving according to claim 2, wherein the compound (A) having at least one of a hydrolyzable silyl group and a silanol group is a silane coupling agent comprising from 1 to 5 silane coupling groups in a molecule.

26. The method for producing a relief printing plate precursor for laser engraving according to claim 2, wherein the compound (A) having at least one of a hydrolyzable silyl group and a silanol group is a silane coupling agent comprising from 2 to 4 silane coupling groups in a molecule.

27. The method for producing a relief printing plate precursor for laser engraving according to claim 2, wherein the resin composition for laser engraving further comprises a catalyst (C) for alcohol exchange reaction, and wherein the catalyst (C) for alcohol exchange reaction comprises an acid or basic catalyst, or a metal complex catalyst.

28. The method for producing a relief printing plate precursor for laser engraving according to claim 27, wherein the acidic catalyst comprises halogenated hydrogen, nitric acid, sulfuric acid, sulfurous acid, hydrogen sulfide, perchloric acid, hydrogen peroxide, carbonic acid, carboxylic acid, substituted carboxylic acid, sulfonic acid, phosphoric acid, heteropoly acid, or inorganic solid acid.

29. The method for producing a relief printing plate precursor for laser engraving according to claim 27, wherein the acidic catalyst comprises sulfonic acid or phosphoric acid.

30. The method for producing a relief printing plate precursor for laser engraving according to claim 27, wherein the basic catalyst comprises an ammoniacal base, amines, alkali metal hydroxides, alkali metal alkoxides, alkaline earth oxides, quaternary ammonium salt compounds, or quaternary phosphonium salt compounds.

* * * * *